(12) United States Patent
Santacesaria et al.

(10) Patent No.: US 10,308,784 B2
(45) Date of Patent: Jun. 4, 2019

(54) THERMOCHEMICAL PROCESS FOR RECOVERING FIBERGLASS REINFORCED PLASTICS WASTE MATTER

(71) Applicant: KOREC S.r.l., Bientina (PI) (IT)

(72) Inventors: Elio Santacesaria, Milan (IT); Riccardo Tesser, Caserta (IT); Salvatore Mallardo, Giugliano In Campania (IT); Rosa Vitiello, Scafati (IT); Martino Di Serio, Cava Dei Tirreni (IT); Antonello Dimiccoli, Calcinaia (IT); Laura Saviano, Calcinaia (IT)

(73) Assignee: KOREC S.R.L., Bientina, Pi (IT)

( * ) Notice: Subject to any disclaimer, the term of this patent is extended or adjusted under 35 U.S.C. 154(b) by 151 days.

(21) Appl. No.: 15/119,011

(22) PCT Filed: Mar. 4, 2015

(86) PCT No.: PCT/IB2015/051593
§ 371 (c)(1),
(2) Date: Aug. 15, 2016

(87) PCT Pub. No.: WO2015/162505
PCT Pub. Date: Oct. 29, 2015

(65) Prior Publication Data
US 2017/0218164 A1 Aug. 3, 2017

(30) Foreign Application Priority Data

Mar. 4, 2014 (IT) .............................. RM2014A0100

(51) Int. Cl.
*C08J 11/12* (2006.01)
*C10B 53/07* (2006.01)
(Continued)

(52) U.S. Cl.
CPC ................ *C08J 11/12* (2013.01); *C10B 5/00* (2013.01); *C10B 53/07* (2013.01); *C10G 1/10* (2013.01);
(Continued)

(58) Field of Classification Search
CPC .......... C08J 11/12; C10B 53/07; Y02P 20/143
See application file for complete search history.

(56) References Cited

U.S. PATENT DOCUMENTS

2004/0237405 A1* 12/2004 Takeuchi ................ C03C 1/024
48/197 FM

FOREIGN PATENT DOCUMENTS

JP          2000-301131 A          10/2000

OTHER PUBLICATIONS

Search Report dated Nov. 11, 2015 for Application No. PCT/IB2015/051593.
(Continued)

*Primary Examiner* — Kara B Boyle
(74) *Attorney, Agent, or Firm* — Ladas & Parry LLP; Malcolm J. MacDonald

(57) ABSTRACT

The invention relates to a pyrolysis process carried out in the presence of a controlled carbon dioxide environment that allows recovering both the organic portion and the inorganic portion (glass fibers) of a fiberglass-reinforced plastic waste, at an organic yield recovered even higher than 95% by weight and with a suitable for manufacturing new articles, in particular fiberglass-reinforced plastic articles, which provides a profitable to the disposal in dump areas. In particular, the recovered organic products can be mixed as such, at a percentage as high as 20% and more, with a fresh unsaturated polyester resins that is normally used to manufacture common fiberglass-reinforced plastic articles, without worsening its features with respect to articles made starting from
(Continued)

fresh resin alone. The glass fibers, which are fully recovered in a combustion treatment after the pyrolysis, are reused fully replacing the corresponding virgin glass fibers, since they are unbroken and perfectly clean in a final step of the process.

38 Claims, 7 Drawing Sheets

(51) Int. Cl.
    *C10G 1/10*     (2006.01)
    *C10B 5/00*     (2006.01)

(52) U.S. Cl.
    CPC ........ *C08J 2331/02* (2013.01); *C08J 2367/06* (2013.01); *Y02P 20/143* (2015.11)

(56) References Cited

OTHER PUBLICATIONS

Patent Abstracts of Japan-English abstract of JP 2000-301131 A.
Cunliffe, A.M., et al, "Characterisation of products from the recycling of glass fibre reinforced polyester waste by pyrolysis", Fuel IPC Science and Technology Press, vol. 82., No. 18, Dec. 1, 2003, pp. 2223-2230.
Akesson, D., et al., "Products obtained from decomposition of glass fiber-reinforced composites using microwave pyrolysis", Polimery, vol. 58, Jan. 1, 2013, pp. 582-586.
Akesson, D., et al., "Microwave pyrolysis as a method of recycling glass fibre from used blades of wind turbines", Journal of Reinforced Plastics & Composites, vol. 31, No. 17, Sep. 1, 2012, pp. 1136-1142.
Suyama, K., et al., "Degradation of crosslinked unsaturated polyesters in sub-critical water", Polymer Degradation and Stability, vol. 92, 2007, pp. 317-322.
Sugeta, T., et al., "Decomposition of fiber reinforced plastics using fluid at high temperature and pressure", Kobunshi Ronbunshu, vol. 58, No. 10, 2001, abstract.
Economy, J., et al., "A New Concept for Recycling of Thermosetting Resins I: The Case of Crosslinkable Copolyesters", Polymers for Advance Technologies, vol. 7, 1996, pp. 561-570.
Yoon, K.H., et al., "Recycling of unsaturated polyester resin using propylene glycol", Polymer, vol. 38, No. 9, 1997, pp. 2281-2285.
Iwaya, T, et al., "Recycling of fiber reinforced plastics using depolymerization by solvothermal reaction with catalyst", J. Mater Sci., vol. 43, 2008, pp. 2452-2456.
Okajima, I., et al., "Decomposition of epoxy resin and recycling of CFRP with sub- and supercritical water" Kagaku Kogaku Ronbunshu, vol. 28, No. 5, 2002, abstract.
Kamimura, A, et al.," Effective Depolymerization Waste FRPs by Treatment with DMAP and Supercritical Alcohol", Chemistry Letters, vol. 35, No. 6, 2006, abstract.
Kamimura, A., et al., "Efficient chemical recycling of waste fiber-reinforced plastics: use of reduced amounts of dimethylaminopyridine and activated charcoal for the purification of recovered monomer", J. Mater Cycles Waste Manag., vol. 12, 2010, pp. 93-97.
Kamimura, A., et al., "DMAP as an Effective Catalyst To Accelerate the Solubilization of Waste Fiber-Reinforced Plastics", Chem. Sus. Chem., vol. 1, 2008, pp. 845-850.
Goto, M., "Chemical recycling of plastics using sub- and supercritical fluids", J. of Supercritical Fluids, vol. 47, 2009, pp. 500-507.
Nakagawa, T., "FRP recycling technology using sub-critical water hydrolysis", JEC Composites, N. 40, 2008, abstract.
Hong, L, et al., "Thermogravimetric analysis and kinetic study of waste printed circuit board in various atmospheres", Advanced Materials Research vols., 2014, pp. 1929-1932.
Zhang, Z, et al., "Experimental Research on Microwave Induced Thermal Decomposition of Printed Circuit Board Wastes", Proceedings of the 18$^{th}$ Annual North American Waste-to-Energy Conference NAWTEC18, May 11-13, 2010, pp. 1-7.
Guo, X, et al., "Study on low-temperature pyrolysis of large-size printed circuit boards", Journal of Analytical and Applied Pyrolysis, vol. 105, 2014, pp. 151-156.

* cited by examiner

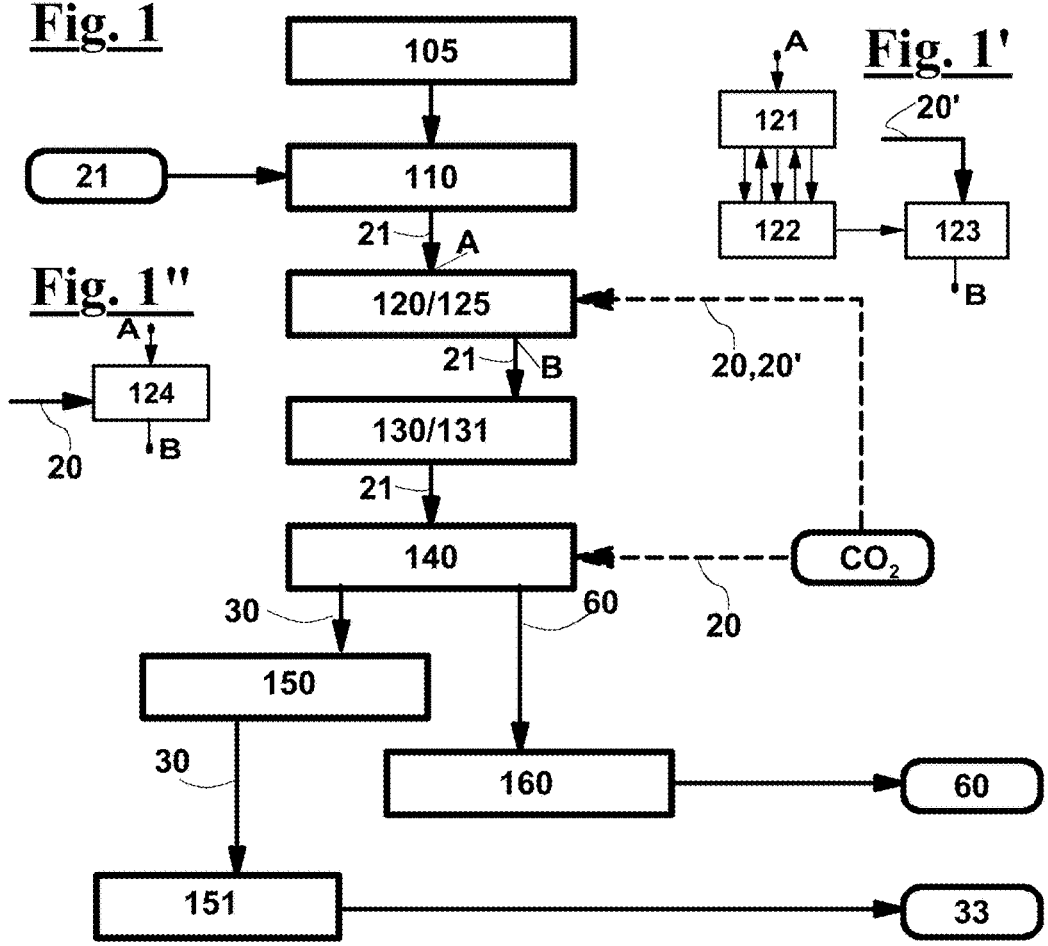
Fig. 1
Fig. 1'
Fig. 1"
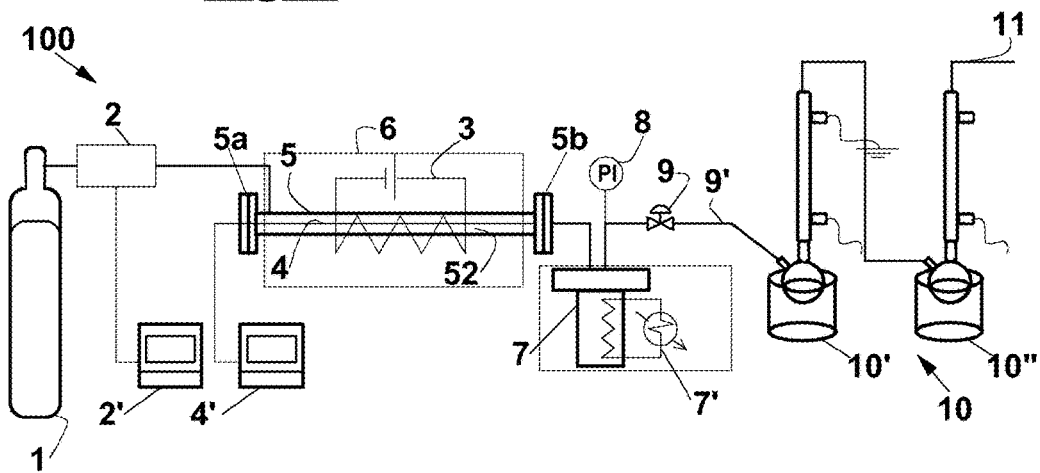
Fig. 2

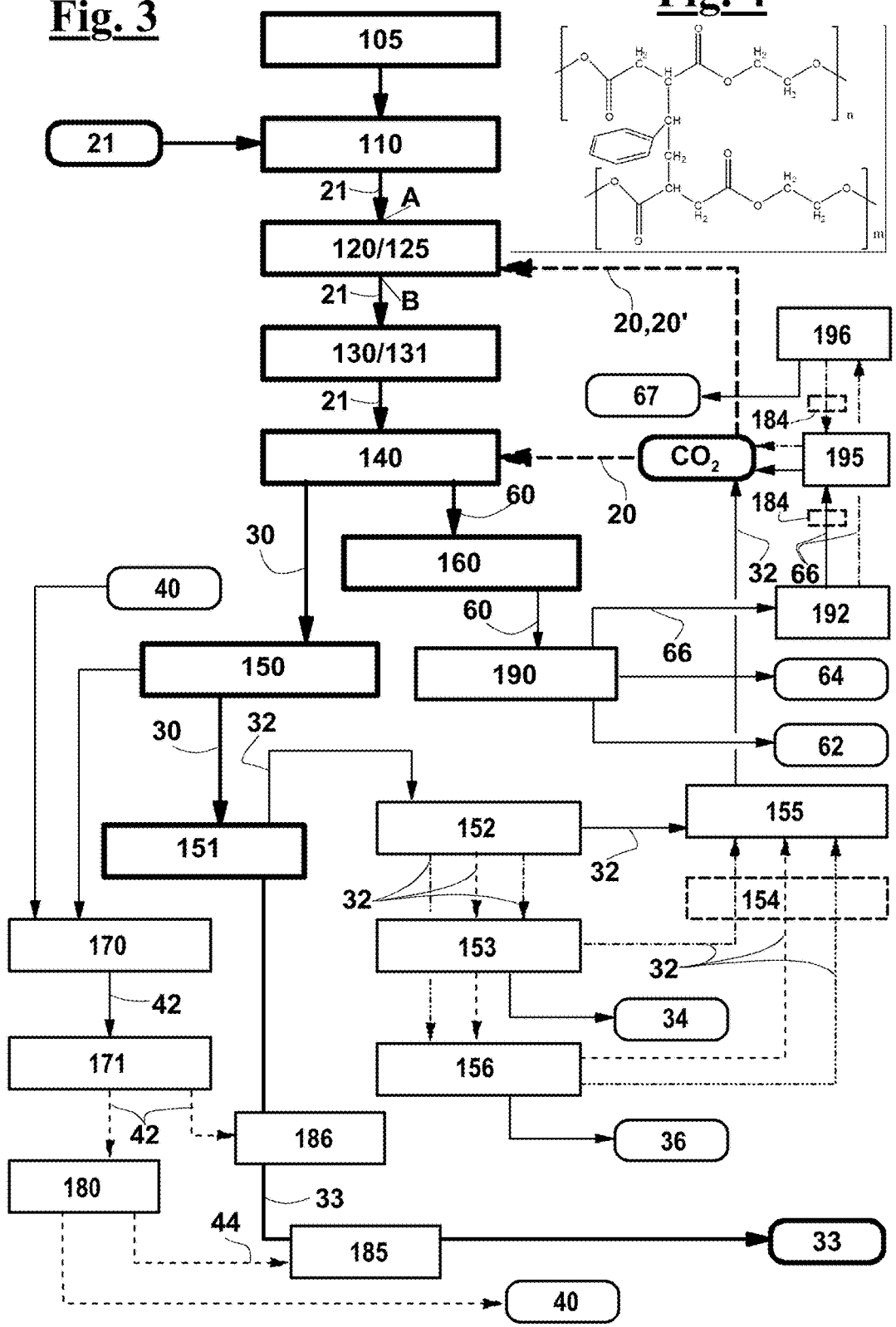

THERMOCHEMICAL PROCESS FOR RECOVERING FIBERGLASS REINFORCED PLASTICS WASTE MATTER

This application is a 371 of PCT/IB2015/051593, filed on Mar. 4, 2015, which claims priority to Italian Application No. RM2014A000100, filed Mar. 4, 2014.

FIELD OF THE INVENTION

The present invention relates to a process for the pyrolysis of fiberglass-reinforced plastic waste, in order to recover organic and inorganic components in such a state as to allow them to be advantageously reused as raw materials for making new objects. By waste are meant production scrapes and articles at the end of their life cycle, obsolete articles, or in any case articles that cannot be used any longer.

PRIOR ART

As well known, by "fiberglass-reinforced plastics" is meant a structural composite material including a thermosetting resin matrix, normally 60-70% by weight, which is reinforced with glass fibers, and usually also contains pigments, additives and fillers. The resin is obtained by cross-linking an orthophthalic, isophthalic or vinylester unsaturated polyester prepolymer, which is in turn obtained by a polycondensation reaction of saturated and unsaturated dicarboxylic acids with glycols, such as ethylene and/or propylene and/or neopentyl glycol. The unsaturation degree can be determined as the iodine number. For instance, an orthophthalic prepolymer normally has an iodine number I.N.=179.6 g $I_2$/100 g of sample, which corresponds to 0.7071 moles of unsaturations per 100 g of sample. After polycondensation, the prepolymer is dissolved into a solvent, e.g. styrene, about 40% by weight.

Depending on the production process and on the final use of the fiberglass-reinforced plastics, glass fibers can be used in the form of thin sheets or "mats" of a nonwoven fabric of glass threads including continuous or cut fibers, or in the form of tissues or mats having desired pattern. The industrial methods for making fiberglass-reinforced plastic structures, which are still normally manual methods, comprise substantially contemporaneous steps of lamination, by which layers of resin and of glass fibers are alternately laid on one another, and of polymerization and reticulation, i.e. cross-bonding steps, by which the resin is hardened, in the presence of an organic peroxide catalyst. In these steps, radical reactions occur involving the double bonds of the prepolymer chains and of styrene, which acts both as a reticulating agent and as a solvent, and intermolecular bonds are formed between the chains. FIG. 4 shows an example of a structure formula of a polyester resin obtained from fumaric acid.

Commercial resins normally contain a chain initiator such as a cobalt-organic compound, which cannot cause a premature hardening if a catalyst is not present.

In order to obtain fiberglass-reinforced plastic articles having a well-finished and weatherproof surface, a layer gelcoat is often used, i.e. a layer of a thixotropic colored unsaturated polyester resin including pigments, additives and various fillers, which is laid on the mold immediately before the lamination step.

Fiberglass-reinforced composite materials, including fiberglass-reinforced plastics, are commercially important since they provide particular combinations of different features that cannot be present at the same time in traditional materials such as metal alloys, ceramic materials and unreinforced polymer materials. These composites are very light and mechanically resistant, an excellently durable, chemically resistant and have a low heat and electric conductivity. For this reason, fiberglass-reinforced plastics have been widely used since the 50's in many applications, initially as a material for aerospace applications and the also for making more commons articles in the automotive industry (portions of car bodies, control panels, bumpers); in the nautical or marine industry (hulls, decks, masts, construction profiles, anchor buoys, protective structures for motors, internal panels); in the building sector (underground pipes, structural profiles, railings, roof gutters, doors or windows); in the chemical industry (pipes, vessels and pressure vessels, valves, pumps, impellers); in the electric industry (boards, electric boxes, switches, insulators, connectors, conduits); in the farm industry (storage bins, greenhouses, pileworks, fencings); in the sport industry (golf clubs, tennis rackets, sport helmets, skis, surf tables and snowboards, bows and arrows, bicycles, fishing rods, canoes, swimming pools).

Such a widespread diffusion has caused an important increase of scrapes and of old and obsolete articles over the years, in any case of articles to be disposed. For instance, about $10^6$ t/year of fiberglass-reinforced plastic waste are produced in Europe on average, and a significant decrease of this growth is not expected. The disposal of these waste material has become critical both for the costs it involves and for the volumes to be treated, and since less and less dump areas are available where the fiberglass-reinforced plastic waste is disposed due to its poor recyclability, in spite of its environmental sustainability index, which is higher than in the case of conventional materials, in most applications. As well known, the items containing a thermoset material cannot be molded and reshaped, unlike thermoplastic materials.

However, it is not convenient to dispose fiberglass-reinforced plastic waste in dumps, since it is substantially not biodegradable, and since it contains relatively valuable portions that should be usefully recycled to produce new articles, which would provide a more advantageous balance of technical performances and environmental compatibility of fiberglass-reinforced plastics.

The so far proposed methods for disposing fiberglass-reinforced plastic waste cannot be profitably used at an industrial scale, since they involve such problems as a low yield, components difficult to separate, low quality of the recycled product, economic unsustainability of the process and high environmental impact. They cabin be classified as:

mechanical recycling, the only process that has had been commercially used to some extent, comprising mechanically grinding the waste and reusing the chips or the powder so obtained as a filler in a concrete matter or in a mixture with a virgin resin amount, to mold new articles. However, the step of grinding requires a lot of energy and involves high maintenance costs since the grinding elements of the special equipment must be frequently replaced, due to the high abrasiveness of the glass fibers;

combustion, which allows a relatively low heat recovery, and does not solve such problems as air pollution, too high resource waste and production of large amounts of ashes, up to 70% of the waste, which must be from disposed in a dump area. A more advantageous energy recovery can be obtained if the waste is burnt in concrete ovens, as well as a more useful reuse of glass fibers and filer, which are incorporated in the concrete, but this does not solve such problems as atmosphere emissions of polluting substances and glass fibers containing particulate into atmosphere;

thermochemically extracting the fibers, e.g. vacuum pyrolysis, other fluid-bed thermal processes, cold extraction with a supercritical fluid used as a solvent, which turned out to be profitable for composite materials including valuable fibers, such as carbon fibers or Kevlar fibers, but is unprofitable for common fiberglass-reinforced plastics;

chemical methods: the processes of refs. 1 to 11, some of which summarized in Italian patent application ITRM2014A000100, have provide at least one drawback, such as low yield, components difficult to separate, low quality of the recycled product, high cost of specific reagents and/or presence of catalyzers that can pollute the final product.

In the pyrolysis processes, the macromolecules of the material are broken, and an organic fraction comprising smaller molecules is normally produced as a liquid, or in any case as a condensable matter.

Cunliffe et al [12] relate to a process for the pyrolysis of fiberglass-reinforced plastics under nitrogen that is carried out at 450° C. and at atmospheric pressure, in which a gas is obtained containing CO, $CO_2$, $H_2$, $CH_4$ and other hydrocarbons light, as the result of the pyrolysis reactions; an oil is also obtained as well as a solid residue consisting of glass fibers and of a high amount of a pitch material, 16% by weight. The glass fibers are separated by burning the pitch material. By burning the organic gas, enough heat is obtained to cover the thermal requirements of the process. A reference is made to the possibility of recycling such monomers as phthalic anhydride and styrene, of which the oil is rich, for producing a prepolymer and a polyester resin, respectively, provided the monomers are separated.

JP 2000 301131 A describes a process for treating discarded printed circuits (PCB, Printed Circuit Boards), in order to recover the metals therefrom, which is carried in the presence of nitrogen and of a certain amount of oxygen, up to 10% by volume, after which the circuits are heated up to a temperature of at least 250° C., and then cooling them down under an inert blanket, so as to cause an embrittlement of the plastic portion of the circuit and to assist milling and subsequent mesh separation of the metal, while the recovery the polymeric fraction it is not described.

Also Hong et al. [13], Zhixiao Zhang et al. [14], Xiaojuan Guo et al. [15] deal with methods for treating PCB. In particular, the first two documents show the results of a thermogravimetric investigations on some materials treated at a temperature up to 1100° C., under nitrogen, under $CO_2$ or in combustion conditions, in order to identify which thermal process is most suitable, in particular for recovering the metals from the circuits, which can be possibly pulverized. Up to such a temperature as 500-600° C., no differences are shown in the behavior of the PCB material whether it is treated under nitrogen or $CO_2$. The transformed organic portion is taken into consideration for the recovery of energy only.

In particular, Zhixiao Zhang [14] relates to PCB including substrates containing an epoxy resin, and describes the use of microwaves to speed-up the nitrogen treatment. This document also mentions the recovery of useful products such as phenol and bisphenol derivatives from the liquid matter obtained by treating the organic fraction, provided an expensive removal or destruction of possible bromine-containing compounds is carried out.

Xiaojuan Guo [15] also deals with a pyrolysis treatment of printed circuits containing epoxy resins under nitrogen that produces a gas and low amounts of oil, which are burnt to provide the heat required to maintain the pyrolysis process.

SUMMARY OF THE INVENTION

It is a feature of the invention to provide a thermochemical process for disposing a waste containing an unsaturated polyester resin, in particular a fiberglass-reinforced plastic waste, which makes it possible to recover an organic portion therefrom, which can be reused as such ad a raw material, typically in mixture with an amount of fresh prepolymer, to produce a new radically crosslinkable resin, in particular a new polyester resin.

It is a particular feature of the invention to provide such a process that allows recovering the organic portion at a higher yield than the prior art processes.

It is also a feature of the invention to provide a thermochemical process for disposing a fiberglass-reinforced plastic waste, which makes it possible to recover the inorganic portion of the waste, essentially glass fibers, in such amounts to allow a reuse in the same way as fresh glass fibers.

These and other objects are achieved by a process for treating a fiberglass-reinforced plastic waste comprising:
a matrix of an unsaturated polyester resin, in particular selected between an isophthalic resin, an orthophthalic resin, a vinylester resin or a combination thereof;
reinforcement glass fibers incorporated in the matrix, wherein steps are provided of:
prearranging a reactor, preferably of stainless steel, comprising a pyrolysis chamber;
feeding the fiberglass-reinforced plastic waste into the pyrolysis chamber;
removing oxygen from the pyrolysis chamber down to a predetermined residual oxygen concentration, in particular until air is substantially eliminated from the reactor;
creating a $CO_2$-containing environment in the pyrolysis chamber that has a $CO_2$ volume concentration of at least 30%, preferably a volume concentration set between 30% and 100%, more preferably set between 50% and 100% and even more preferably a volume concentration set between 80 and 100%;
heating the fiberglass-reinforced plastic waste in the pyrolysis chamber and reaching a pyrolysis temperature set between 350° C. and 550° C., wherein the step of removing oxygen and the step of reaching a pyrolysis temperature are carried out in such a way that the residual oxygen concentration is attained before reaching the pyrolysis temperature;
maintaining the $CO_2$-containing environment and controlling the temperature of said reactor so as to maintain said pyrolysis temperature in the pyrolysis chamber, for a predetermined residence time, in particular set between 1 hour and 5 hours responsive to the pyrolysis temperature and to the pyrolysis pressure, obtaining a gas mixture containing products of pyrolysis of the unsaturated polyester resin, and a solid residue comprising the glass fibers;
extracting the gas mixture from the pyrolysis chamber and cooling it down to a predetermined temperature so as to condensate the products of pyrolysis from the gas mixture, in order to obtain a condensate liquid phase comprising a main amount of the product of pyrolysis that it is separated from the uncondensed gas;
extracting the solid residue from the pyrolysis chamber.

According to another aspect of the invention, the objects above indicated are achieved by a process for treating an unsaturated polyester resin waste wherein steps are provided of:

prearranging a reactor, preferably of stainless steel, comprising a pyrolysis chamber;

feeding the unsaturated polyester resin waste in the pyrolysis chamber;

removing oxygen from the pyrolysis chamber down to a predetermined residual oxygen concentration, in particular until air is substantially eliminated from the reactor;

creating a $CO_2$-containing environment in the pyrolysis chamber that has a $CO_2$ volume concentration of at least 30%, preferably a volume concentration set between 30% and 100%, more preferably between 50% and 100% and even more preferably a volume concentration set between 80% and 100%;

heating the unsaturated polyester resin waste in the pyrolysis chamber and reaching a pyrolysis temperature set between 350° C. and 550° C., wherein the step of removing oxygen and the step of reaching a pyrolysis temperature are carried out in such a way that the residual oxygen concentration is attained before reaching the pyrolysis temperature;

maintaining the $CO_2$-containing environment and controlling the temperature of said reactor so as to maintain said pyrolysis temperature in the pyrolysis chamber, for a predetermined residence time, in particular set between 1 hour and 5 hours responsive to the pyrolysis temperature and to the pyrolysis pressure, obtaining a gas mixture containing products of pyrolysis of the unsaturated polyester resin;

extracting the gas mixture from the pyrolysis chamber and cooling it down to a predetermined temperature so as to condensate the products of pyrolysis from the gas mixture, in order to obtain a condensate liquid phase comprising a main amount of the product of pyrolysis that it is separated from the uncondensed gas.

After condensation, the recovered products of pyrolysis are advantageously subjected to analytical investigations, in particular, in order to establish their iodine number, which is an estimate of the number of double bonds that are present in the molecules and, therefore, allow t assess whether the latter can undergo crosslinking polymerization reactions. A higher iodine number means a better suitability of the products of pyrolysis to be recycled into the production process of new fiberglass-reinforced plastic articles, in a mixture with the commercially available or fresh unsaturated polyester resins, which are free from recycled products.

The pyrolysis process in a $CO_2$-containing environment, previously described, allows obtaining unexpected and excellent results.

With reference to the recovered organic portion, the pyrolysis thermal treatment under a $CO_2$ flow allows very high yield values, both as absolute values and with respect to the yield values of other pyrolysis treatments. For instance, as shown in Example 1, the organic liquid yield surprisingly achieves values even higher than 80% by weight, therefore only a small amount of organic residue is produced which settles substantially only on the glass fibers, from which it can be easily separated. Comparison tests have shown that conventional pyrolysis processes, which are carried out in a nitrogen or in a steam environment, definitely provide yield values lower than 48%, in spite of long residence times, and 56% by weight, respectively, and give rise to larger amounts of a carbonaceous and/or organic residue, for example of a pitch material, which in part settles on the glass fibers. In particular, the steam pyrolysis produces a sticky organic liquid that forms colloids and more in particular emulsions with water, and that is difficult to separable from the emulsion water.

Example 2 provides an estimate of the yield values expected under optimal process conditions, according to the invention, which are surprisingly even higher r 96% by weight.

Moreover, the organic liquid obtained by the process according to the invention is particularly suitable to be recycled to the production process of fiberglass-reinforced plastics, i.e. to a new polymerization as a mixture with commercial unsaturated resins. As still shown in Example 1, the organic liquid obtained by a pyrolysis carried out in a $CO_2$-containing environment has an iodine number as high as 77, instead of such values as 42 and 48 obtained in a nitrogen or steam pyrolysis, respectively.

The above-mentioned improvements are confirmed by Example 3, in which I.N. values are attained between 95 and 100. These values are comparable with the value of 179 of a corresponding fresh prepolymer, which contains, however, about 40% styrene, a highly unsaturated molecule. If styrene is distilled away, the iodine number of this prepolymer, alone, drops to 67. If styrene, and any possible volatile product, is removed from the pyrolysis organic liquid, the iodine number decreases to a value between 50 and 60, which fully comparable with the iodine number of the fresh prepolymer without styrene. The high iodine numbers of the pyrolysis liquid without styrene and volatile compounds indicate that the pyrolysis liquid contains macromolecules providing double bonds available for a crosslinking reaction that would take place when recycling the pyrolysis organic liquid.

As pointed out in Example 5, the fiberglass-reinforced plastic articles obtained from a raw material containing the organic product recovered by the pyrolysis of the invention show properties that are substantially unaffected with respect to fiberglass-reinforced plastics products obtained from commercial raw materials, but the cost of the are raw materials is remarkably lower.

Moreover, unbroken and perfectly clean glass fibers can be easily obtained from the solid residue, which can therefore be recycled for making new articles, as discussed hereinafter.

Optionally, a step can be provided of preliminarily reducing the size, or crushing, of the fiberglass-reinforced plastic waste, for example by a grinding step.

The step of removing oxygen can be carried out by causing a cold inert gas such as nitrogen or carbon dioxide itself to flow so as to purge the air completely from the pyrolysis chamber, and then pre-heating the pyrolysis chamber maintaining a flow of carbon dioxide, until said predetermined pyrolysis temperature is attained, and maintaining said predetermined pyrolysis pressure.

The condensation step can be carried out in a condenser, which may comprise two or more serially connected containers cooled from the outside.

In an exemplary embodiment, the step of creating a $CO_2$-containing environment and the step of removing oxygen are carried out at the same time by a step of maintaining a substantially pure $CO_2$ flow through the pyrolysis chamber. The heating step can be carried out at least in part by heating the stream of carbon dioxide once the oxygen concentration limit value has been reached. The pressure in the reactor can be adjusted at the predetermined level even since the beginning of the step of heating.

As an alternative, the step of creating a $CO_2$-containing environment and the step of removing oxygen comprise alternating in the chamber at least one steps of supplying an amount of an inert gas, in particular nitrogen, or of substantially pure $CO_2$, with at least one steps of creating a vacuum degree, and a final step of supplying a final amount of substantially pure $CO_2$ at a predetermined pressure after alternating the steps of supplying $CO_2$ and of creating a vacuum degree.

Advantageously, the residual oxygen concentration is lower than 10%, preferably is lower than 5%, in particular is lower than 2%, more in particular is lower than 1%.

Advantageously, the pyrolysis temperature is set between 400 and 500° C., preferably, between 400° C. and 450° C. In this case, the residence time of the waste in the pyrolysis chamber is preferably set between 1 and 2 hours, for example between 1.5 and 2 hours. This way, in optimal process conditions, is possible to recover more than 95% by weight of the organic portion of the fiberglass-reinforced plastics, or of the unsaturated polyester resin, in the form of a viscous liquid that can be mixed as such with a commercial unsaturated resin and undergo a crosslinking reaction to provide fiberglass-reinforced plastic articles whose quality is substantially the same as the articles made from a fresh unsaturated resin alone, as Examples 3 and 5 indicate. A temperature different from the above is however acceptable, even if lower temperatures slow down the process, while higher temperatures increase the amount of carbonaceous residue that settles on the fibers.

In particular, the step of maintaining the $CO_2$-containing environment and the pyrolysis temperature in the chamber is carried out at a pressure set between 0.2 and 20 bar absolute, in particular at a pressure set between 1 and 10 bar absolute. In an exemplary embodiment, the step of maintaining the $CO_2$-containing environment and the pyrolysis temperature in the chamber is carried out at a pressure higher than 6 bar absolute.

This way, as Example 4 indicates, the yield of recovered organic fraction further increases, as well as the iodine number. Moreover, a decrease is obtained of the costs associated to the reuse of the $CO_2$ extracted from the pyrolysis chamber after condensing the products of pyrolysis, since only slight compression and a cooling are required for storing the $CO_2$ in a recirculation tank. The design working pressure obviously affects some features of the process plant to provide the process, which affects the investment costs.

As an alternative, the step of maintaining the $CO_2$-containing environment and the pyrolysis temperature in the chamber is carried out at a pressure higher than 73 bar absolute, i.e. at a supercritical pressure, i.e. at a pressure higher than the critical pressure of $CO_2$. This further increases the yield and the viscosity of the liquid, as Example 4 still indicates.

Optionally, the process can also comprise a step of collecting a non-condensable gas left by the step of condensing the gas mixture containing the products of pyrolysis, containing $CO_2$ and a step of recycling or recirculating this non-condensable gas into the pyrolysis chamber, which is carried out during the step of creating a $CO_2$-containing environment and/or during the step of maintaining the $CO_2$-containing environment and the pyrolysis temperature.

Before being recycled into the pyrolysis chamber, the non-condensable gas may undergo a purification step, in particular, in order to remove a vapor residue of the products of pyrolysis, for example by a combustion step, and/or in order to remove moisture from the non-condensable gas, for example by a condensation step.

After the steps of extracting the gas mixture and the solid residue, if any, from the pyrolysis chamber, a step can also be provided of washing the chamber, and/or the condenser, with a washing solvent, selected for instance among acetone; methyl-ethyl-ketone; tetrahydrofuran; styrene; methyl methacrylate, and mixtures thereof, so as to form a solution of further products of pyrolysis that were left back in the chamber solvent, as well as a step of removing this solution from the pyrolysis chamber. This makes it possible to recover the organic liquid product that remains stuck on the inner walls of the pyrolysis chamber or on the glass fibers, which further improves the yield of the process.

In an exemplary embodiment, steps can be provided of:
  separating the solvent from the further products of pyrolysis, for example by evaporation or distillation, in order to recover the whole liquid obtained by the pyrolysis;
  mixing the products of pyrolysis recovered in the step of separating the solvent with the products of pyrolysis recovered in the step of condensing from the gas mixture.

Preferably, a step is provided of recovering the washing solvent, and a step of recirculating the washing solvent to a subsequent step of washing.

Advantageously, if methyl-methacrylate and styrene are used as the solvent, a step is provided of mixing the solution of the further products of pyrolysis with the products of pyrolysis recovered in the step of condensing the gas mixture, preferably according to proportions established in such a way to obtain a mixture that has a predetermined iodine number and/or a predetermined viscosity. In other words, the methyl methacrylate or the styrene used as extraction solvent are not withdrawn from the organic liquid, but are left in the organic phase, since they also behave as reticulating monomers, during a subsequent production of new fiberglass-reinforced plastic objects. This further increases the iodine number of the recycled resin.

It falls within the scope of the invention also a process for making an article based on a thermosetting polyester resin, in particular an article made of a fiberglass-reinforced plastics, wherein said thermosetting polyester resin is obtained starting from an unsaturated polyester resin comprising the above-mentioned products of pyrolysis. In fact, the resin recovered can be mixed with the fresh prepolymer also at a very high percentage, since it has a full chemical compatibility with it. In Example 5, some composite specimens are made by mixing commercially available virgin resins with the liquid produced by the pyrolysis according to the invention, according to weight proportions ranging from 5% to 20%. In no case, drawbacks are observed during the polymerization. Moreover, the specimens had neither a lower mechanical resistance, nor a worse appearance, with respect to the specimens obtained starting from the virgin resin. Even larger amounts of recovered material can be used in the mixture with the fresh prepolymer, as the excellent quali-quantitative results of the tests of Example 5 suggest.

The solid residue left after the step of maintaining, i.e. after the pyrolysis, can also comprise a certain amount of a solid organic deposit, of which a separation step is provided from the glass fibers, i.e. a step is provided of purifying the latter, which is advantageously carried out as a step of heating and treating the solid residue in air at a temperature between 500° C. and 750° C., preferably between 600° C. and 700° C., for a predetermined time, so as to cause a combustion, i.e. to burn the solid organic deposit stuck on the glass fibers, in such a way that the solid residue contains substantially only an inorganic material comprising the glass fibers, at the end of this treatment.

The heating step and treatment can be carried out in the pyrolysis chamber. As an alternative, before said step of heating and treating, a step can be provided of conveying the solid organic deposit from the pyrolysis chamber into a combustion chamber where the step of heating up to the treatment temperature takes place, followed by the treatment, i.e. the calcination.

Advantageously, the process can also comprise a step of collecting a combustion gas produced in the step of heating and treating the solid residue, which contains $CO_2$, as well a step can be provided of recycling or recirculating this combustion gas into the pyrolysis chamber, which is carried out during the step of creating a $CO_2$-containing environment and/or during the step of maintaining the $CO_2$-containing environment and the pyrolysis temperature. Before being recycled into the pyrolysis chamber, the combustion gas may undergo a step of purification, in particular in order to remove moisture, for instance by condensation, and/or in order to remove impurities formed during the combustion, such as CO, NOx, hydrocarbons, for example by a catalytic oxidation.

In particular, after the treatment, the solid residue can also contain an inorganic particulate matter in the form of scales and dust, comprising in particular pigments, or fillers or additives of the fiberglass-reinforced plastic waste, in particular in the gelcoat portion that can be present in the waste. Preferably, a step is provided of recovering an amount of heat produced by said burn, and preferably also a step of exploiting the recovered heat for preheating the $CO_2$ gas and the fiberglass-reinforced plastic waste fed to the reactor. The solid residue after combustion can be weighed in order to estimate the amount of the carbonaceous residue deposit that has been burnt, which has been done in the laboratory tests.

Advantageously, after the combustion of the residual organic a step is provided of mechanically separating the glass fibers from the above-mentioned inorganic particulate matter. Such mechanical separation step can comprise at least one step selected among the steps of separation by shaking, by blowing, by sifting the particulate, and other well-known methods for separating fractions of solids of different shape and size, in order to obtain a clean fiber matter.

As Examples 1, 4 and 5 show, if the solid residue is treated as indicated above, unbroken and perfectly clean glass fibers are recovered, which are substantially in the same conditions as before the use. Therefore, the recovered fibers can completely replace new glass fibers blank in the production of new fiberglass-reinforced plastics semi-finished product and articles, or in any fiberglass-reinforced material.

According to their length, these recovered fibers can be directly recycled as chopped strands, i.e. cut fibers, whose length usually ranges from 3 mm to 25 mm, or as milled fibers, i.e. ground fibers whose length is averagely between 0.1 mm and 0.5 mm, in particular between 0.1 mm and 0.2 mm, for the same applications as new glass fibers are used. In particular, the cut fibers can be used for making the previously mentioned sheets or mats. The cut fibers can also be reused in a resin matrix, by mixing them in a dry state, or by continuously feeding according to a prefixed weight or volume feed rate, or in the concrete and plaster matter. The resin matrix can be used as a reinforcement charge in cast articles, in order to improve their resilience as well as in assembling mastics and plasters.

Instead, ground fibers can be used as a reinforcement material in
  cast articles, in particular made of thermosetting resins: in fact, their thickening power is lower, with respect to cut fibers, therefore larger amounts thereof be used, without reducing the flowability of the casting material;
  in plasters and assembling mastics, which are thermosetting materials;
  in epoxy resins, to prepare high resistance plasters.

Both types of fibers can be mixed with carbon and para-aramid fibers for making mixed tissues, in order to balance some features of these materials, to optimize some property/peso ratios and to reduce the production cost of the articles.

It falls within the field of the invention also a process for making an article in a composite material comprising a step of mixing a base material, in particular a polymeric material such as a polyester resin, with a reinforcing material comprising the glass fibers separated from said residual organic as described above.

In an exemplary embodiment, the reactor comprises a bed 51 of an inert filling material, for instance filling bodies such as Raschig rings, at a $CO_2$ inlet zone proximate to a $CO_2$ inlet port of the pyrolysis chamber, the filling material arranged to allow $CO_2$ to flow through said inert material bed 51 before reaching the waste material arranged in a filling material-free pyrolysis zone of the chamber, and arranged to transmit an amount of heat to the $CO_2$ so as to preheat the $CO_2$ before reaching the waste.

The step of maintaining the $CO_2$-containing environment and the pyrolysis temperature can comprise a step of continuously feeding substantially pure $CO_2$ into the pyrolysis chamber, whereas the step of extracting the gas mixture from the chamber is also carried out continuously during the step of maintaining, in order to keep a predetermined pressure within the chamber.

In an exemplary embodiment, in the step of maintaining, during which the pyrolysis occurs, the step of feeding the waste into the pyrolysis chamber, and possibly also the step of extracting the solid residue is carried out continuously. Advantageously, in this case, the continuous $CO_2$ feeding, the extraction of the gas mixture and the feeding of the waste into the pyrolysis chamber, which has preferably a tubular shape, are carried out in such a way that a countercurrent flow is maintained of the gas stream that, when entering into the pyrolysis chamber, is substantially formed by the $CO_2$ as supplied and that, by flowing within the pyrolysis chamber, becomes richer in pyrolysis products forming said gas mixture containing pyrolysis products, on the one hand, and the solid stream that, by flowing within the chamber, turns from the waste into the solid residue, on the other hand.

BRIEF DESCRIPTION OF THE FIGURES

The description of the invention will be better understood with reference to the attached figures that represent an embodiment thereof, exemplifying but not limitative, and wherein:

FIG. 1 is a flow-sheet of the process according to the invention;

FIGS. 1',1" show alternative ways for removing the oxygen and for creating make a $CO_2$-containing environment from/in the pyrolysis chamber;

FIG. 2 shows a diagram of a possible plant for thermo-chemically treating a fiberglass-reinforced plastic waste under a $CO_2$ gas flow, according to the invention, which can work at different pressure and temperature values;

FIG. 3 is a flow-sheet showing various exemplary embodiments of the process according to the invention;

FIG. 4 shows the chemical structure of a portion of a thermosetting resin based on fumaric acid, where the styrene intermolecular bond is highlighted;

DETAILED DESCRIPTION OF THE INVENTION

Figure 5:
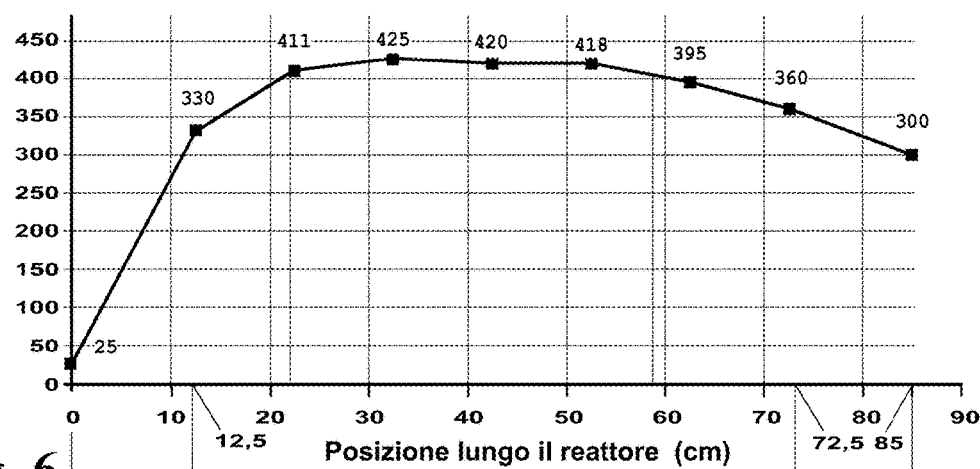
FIG. 5 shows a typical temperature profile of the tubular reactor of FIGS. 6 and 7 during the tests of Examples 3 and 4.

FIG. 1 diagrammatically shows the process, according to an exemplary embodiment of the invention, for recovering the components of a waste 21 comprising an unsaturated polyester resin, for example an orthophthalic, an isophthalic or a vinylester resin, in particular a fiberglass-reinforced plastic waste.

After a step 105 of prearranging a reactor 5, a step 110 is provided of feeding waste 21 into a pyrolysis chamber 52 of the reactor, a step 120 of removing atmospheric oxygen, until a predetermined residual concentration $C_R$ lower than 10% is reached, preferably lower than 5%, in particular lower than 2%, more in particular lower than 1%. The predetermined residual concentration $C_R$ can also be a few ppm, and a step 125 is also provided of creating a $CO_2$-containing environment, with a $CO_2$ volume concentration as high as or higher than 30%, preferably higher than 50%, more preferably higher than 80%. Subsequently, a heating 130 of waste 21 until a pyrolysis temperature $T_P$ is reached, 131, between 350° C. and 550° C., preferably between 400 and 500° C. in such a way that residual oxygen concentration $C_R$ is attained before reaching pyrolysis temperature $T_P$. A step 140 follows of maintaining the $CO_2$-containing environment and pyrolysis temperature $T_P$ for a predetermined residence time, which depends on the pyrolysis temperature, during which a pyrolysis of the polyester resin occurs. With a pyrolysis temperature $T_P$ between 400° C. and 450° C., the residence time can be chosen between 1 hour and 2 hours, in particular between 1.5 and 2 hours.

Pyrolysis 140 yields a gas mixture 30 containing pyrolysis products 33 and, in an exemplary embodiment of the process in which a fiberglass-reinforced plastic waste is treated, a solid residue 60 is also obtained comprising a glass fibers amount 62. A step 150 follows of extracting gas mixture 30 from pyrolysis chamber 52 and a condensation 151 of pyrolysis products 33 from gas mixture 30, in a condensation chamber 10',10", as well as an extraction 160 of solid residue 60, if any.

Pyrolysis products 33 are preferably used in a production process, not shown, for making new articles comprising a thermosetting polyester resins, in particular fiberglass-reinforced plastic articles, where the polyester resin is obtained by crosslinking a mixture of a fresh unsaturated polyester resin and of pyrolysis products 33.

Steps 125 and 120 of creating the $CO_2$-containing environment and of removing oxygen can be made at the same time (FIG. 1") by causing a substantially pure $CO_2$ stream 20 to flow through pyrolysis chamber 52. Instead (FIG. 1'), these steps can be carried out by alternating at least one step 121 of supplying an amount of an inert gas, or of substantially pure $CO_2$, with at least one step 122 of removing the gas so as to create a vacuum degree in pyrolysis chamber 52, and then by performing a final step 123 of supplying an amount 20' of substantially pure $CO_2$ at a prefixed pressure.

In a semicontinuous version of the process, during step 140 of pyrolysis, i.e. while maintaining the $CO_2$-containing environment and pyrolysis temperature $T_P$, the $CO_2$ stream is fed substantially continuously to pyrolysis chamber 52, and extraction 150 of gas mixture 30 is carried out continuously as well, so as to maintain a predetermined pressure within pyrolysis chamber 52.

During the pyrolysis, waste 21 feeding 110 can be carried out continuously as well. In this case, the feeding of $CO_2$, gas extraction 150 and waste 21 feeding 110 are carried out in such a way to maintain in pyrolysis chamber 52 countercurrent flow conditions of the gas stream that, when entering into the chamber, is substantially formed by supplied $CO_2$ 20 and that, while flowing within pyrolysis chamber 52, becomes richer in pyrolysis products, forming gas mixture 30 containing the pyrolysis products, and of solid waste stream 21 being changed into solid residue 60. For instance, these flow conditions can be created in a tubular pyrolysis reactor 5, such as a rotating oven. In a continuous version of the process, also solid residue 60 extraction 160 is carried out continuous.

Step 140 of maintaining the $CO_2$-containing environment and pyrolysis temperature $T_P$ in pyrolysis chamber 52 can be carried out at a substantially atmospheric pressure, or at a pressure about 0.2 bar absolute, or at a pressure higher than the atmospheric pressure, which can be lower or higher than the critical pressure of $CO_2$, which is about 73 bar absolute.

Exemplary embodiments of the process are diagrammatically shown in FIG. 3, where the main steps of FIG. 1 are represented by thick lines. The steps shown in thin lines in the same figure are intended to be optional, and independent from one another, whereas the process alternatives are shown by dotted lines.

In an exemplary embodiment of the process, a step 152 can be provided of collecting a non-condensable gas 32, i.e. a gas residue of condensation 151, followed by a step 155 of recycling non-condensable gas 32 into pyrolysis chamber 52, during creation 125 of the $CO_2$-containing environment and/or during pyrolysis 140. Optionally, before being recycled, non-condensable gas 32 may undergo a step 153 of removing a vapor residue 34 containing pyrolysis products, for example by a combustion, and/or a step 156 of removing a moisture amount 36, for example by a condensation. In particular, combustion 153 for removing vapor residue 34 is carried out before moisture removal 156.

In an exemplary embodiment, a step 170 is provided of washing pyrolysis chamber 52 and/or the condensation chamber with a solvent 40, after the extraction 150 of gas mixture 30 from pyrolysis chamber 52, so as to form a solution 42 of further pyrolysis products 44, which is withdrawn, 171, from pyrolysis chamber 52.

For example, solvent 40 can be acetone, methyl-ethyl-ketone, tetrahydrofuran, alone or mixed with one another. These solvents advantageously undergo a separation 180 from further pyrolysis products 44, typically by evaporation or distillation, which can be followed by a step 185 of mixing the latter with pyrolysis products 33 obtained from condensation 151. These solvents can possibly be recovered and reused in a forthcoming washing step (not shown).

Solvent 40 can also be methyl-methacrylate or styrene, alone or mixed with each other, in this case the separation 180 is preferably omitted, and solution 42 advantageously undergo a step 186 of mixing with pyrolysis products 33 coming from condensation 151, preferably according to proportions established in such a way to obtain a predetermined iodine number and/or a predetermined viscosity of pyrolysis products after mixing step 186.

Solid residue 60 of pyrolysis 140 of fiberglass-reinforced plastic waste 21 typically comprises a solid organic deposit 64, which adheres on glass fibers 62. In an exemplary embodiment, the process provides a separation 190 of said deposit. Separation 190 is preferably carried out by treating solid residue 60 in air at a temperature set between 500° C. and 750° C., preferably between 600° C. and 700° C. for a predetermined treatment time, so as to burn solid organic deposit 64 and to recover substantially clean glass fibers 62, apart from a possible inorganic dust and particulate due to additives that were present in the fiberglass-reinforced plastics or to a gelcoat layer, which can be removed, for instance, by simply shaking, or blowing or sifting the glass fibers. Optionally, a step can be provided, not shown, of recovering the heat produced by combustion 190, which can be used for preheating $CO_2$ 20 and fiberglass-reinforced plastic waste 21 when fed to reactor 5. Separation 190 can be carried out in pyrolysis chamber 52, or can be preceded by a step of conveying solid residue 60 from pyrolysis chamber 52 to a combustion chamber, not shown, where the residue can be heated up to the treatment temperature, followed by the treatment step, typically a calcination.

The process can comprise a step 192 of collecting a combustion gas 66 followed by recycling 195 combustion gas 66 into pyrolysis chamber 52, during creation 125 of the $CO_2$-containing environment and/or during pyrolysis 140. Optionally, before being recycled, combustion gas 66 may undergo a removal 196 of a moisture amount 67, for example by condensation.

In an exemplary embodiment, combustion gas 66 and/or non-condensable gas 32, may undergo (a) step/s 154 and/or 184 of purification to remove impurities possibly generated/left in combustion steps 153 and/or 190, which may contain, for instance, carbon monoxide, nitrogen oxides, or even hydrocarbons, the purification step 184 providing for instance a catalytic oxidation treatment.

In an exemplary embodiment, combustion gas 66 and non-condensable gas 32 can be joined into one stream, not shown, which is recycled into pyrolysis chamber 52, during creation 125 of the $CO_2$-containing environment and/or during pyrolysis 140. Optionally, this stream, before being recycled, may undergo a step 153 of removing a vapor residue containing pyrolysis products, for example by combustion, and/or a step 156 of removing a moisture amount, for example by condensation.

Recovered glass fibers 62 can be used in a production process, not shown, for making new articles of a fiberglass-reinforced composite material, in particular of fiberglass-reinforced plastics, fully or partially replacing fresh glass fibers.

In the tests described in the examples, AISI 304 stainless steel tubular reactors have been used, whose length L was 85 cm.

Each tubular reactor comprised a portion of a length $L_r$ of 12.5 cm arranged between one end and a central pyrolysis chamber of length $L_p$ containing a bed 51 of an inert material consisting of Raschig rings, so that the reactor gas feed came into contact with inert material bed 51 before coming into contact with the waste in the pyrolysis chamber, so as to be preheated before reaching pyrolysis zone or chamber 52.

The laboratory reactor was arranged into an oven 6 provided with a temperature control system, so as to obtain a temperature between 400° C. and 450° C. in the pyrolysis chamber. Another Raschig rings bed 51 was arranged at a reactor end portion of length $L_r$ of 12.5 cm, which was left out of oven 6.

In the examples described hereinafter, waste 21 comprised plates of fiberglass-reinforced plastics based on unsaturated polyester resins, more in detail orthophthalic, isophthalic and vinylester resins, which had been broken into listels of suitable size, for example, 0.3 to 0.8 width×1 to 6 cm length for a smaller laboratory reactor, and into listels of such sizes as 1 to 2 cm width and 10 to 15 cm length, for a larger laboratory reactor.

In the laboratory tests of Examples, the pressure in the pyrolysis chamber was adjusted at a predetermined value since the beginning of the heating.

FIG. 2 is diagrammatical view of a possible production plant or line 100 for carrying out the process according to the invention. This diagrammatical view also relates to the laboratory equipment used to perform the pyrolysis tests in the presence of $CO_2$, according to the invention, and in the presence of inert gas, according to reference well known methods, for the purpose of comparison.

Production line 100 comprises a preferably tubular reactor 5. Line 100 and reactor 5 can be configured for continuously feeding both waste 21 and $CO_2$ 20, and for continuously extracting the pyrolysis products, along with an excess $CO_2$, so as to provide a continuous process. In this case, reactor 5 can be a rotating oven. As an alternative, line 100 and reactor 5 can be configured for arranging a charge of waste 21 in reactor 5 at the beginning of a pyrolysis cycle, for extracting a solid residue of the charge at the end of the cycle, for continuously feeding the $CO_2$, and for continuously extracting the gas products of the pyrolysis along with the excess $CO_2$, so as to provide a semicontinuous process. As an alternative, line 100 and reactor 5 can be configured for arranging a charge of waste 21 and of $CO_2$ in reactor 5 at the beginning of a pyrolysis cycle and for extracting the solid residue and the gas pyrolysis products along with the excess $CO_2$, so as to provide a batch process.

Production line 100 also comprises a carbon dioxide source 1, in the equipment used for the tests described hereinafter a gas bottle 1. A control device is provided to adjust the carbon dioxide flowrate at a predetermined value, which comprises a flow sensor 2, which in the laboratory equipment was a flow meter associated with a hand control valve. However, a remote control device 2' can be provided for remotely reading the and possibly record the $CO_2$ flowrate, which can also be associated to a control valve, not shown, operated by a control signal produced by remote control device 2' responsive to a flowrate set point and to a current flowrate value coming from sensor 2.

A device is also provided for measuring the temperature within reactor 5, which can comprise a plurality of sensors 4, such as thermocouples, arranged at respective positions within reactor 5. In the laboratory equipment, a thermocouple 4 has been used slidably inserted within a sheath 4" consisting of a through stainless steel ⅛" tube, arranged along the axis of tubular reactor 5, whose reading position could be adjusted along the whole reactor length L, in order to determine the axial temperature profile.

In the laboratory equipment, reactor 5 was arranged in a tubular chamber of oven 6, with its two ends 5a, 5b protruding out of it, so as to easily reach the inlet and outlet ports of the gas and of the pyrolysis products, respectively. The oven had a temperature control system 3 configured for establishing a predetermined temperature, in particular between 400° C. and 450° C., within pyrolysis chamber 52 of reactor 5.

Figure 6:
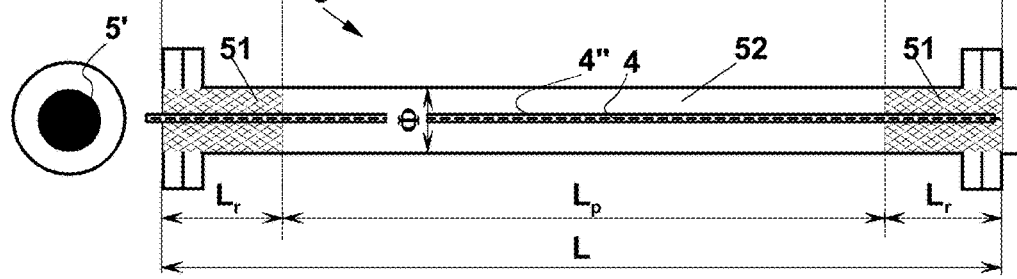
FIG. 6 diagrammatically shows a tubular reactor, of the same type as the one used for the laboratory pyrolysis tests.

The reactors consisted of two tubes of the same length L of 85 cm, but of different inner diameters Φ, a smaller one, 15 mm, and a larger one, 40 mm, as diagrammatically shown in FIG. 6. In both cases, the end portions of reactor 5 protruded by 12.5 cm out of the oven.

In an advantageous exemplary embodiment, tubular pyrolysis reactor 5 comprises a preheating zone proximate to the inlet port of the waste. This preheating zone preferably contains an inert material bed 51, for example comprising filling bodies such as Raschig rings, so that the gas fed to reactor 5 comes into contact with inert material bed 51 before coming into contact with the waste loaded in the reactor. This way, the gas can be preheated before reaching pyrolysis chamber 52, where waste 21 is arranged.

In larger reactor 5, preheating zone 5a included Raschig rings at the end portion of reactor 5 that protruded out of oven 6. Another Raschig rings bed 51 of 12.5 cm length was arranged at the opposite end portion to reactor 5, also protruding out of oven 6.

The pyrolysis products outlet port of reactor 5 is pneumatically connected with a collection vessel 7, preferably configured for containing a predetermined inner pressure. Collection vessel 7 is advantageously provided with a refrigeration system 7', in particular, in the laboratory equipment, it is submerged by a cooling fluid, and with an inner pressure sensor. A pressure control valve 9 is arranged along a vent duct 9' of collection vessel 7 in order to keep the pressure upstream of the valve 9—and so within collection vessel 7—at a predetermined value, which is indicated by a pressure sensor 8. A system 10 for condensing and collecting the pyrolysis products is also provided, which in the laboratory equipment is made consists of two serially arranged devices 10', 10", each comprising a collection vessel immersed in a cooling bath, and of a reflux condenser mounted to each vessel, working at atmospheric pressure. A purge or vent duct 11 comes out of the second condenser for the uncondensed gas.

The smaller reactor has been used:
  in the tests of Example 1, in order to compare the yield that can be obtained in a pyrolysis carried out in the presence of carbon dioxide, with the yield that can be obtained in a conventional pyrolysis, in the presence of an inert gas such as nitrogen and steam, and in order to compare the different operating conditions if carbon dioxide is present;
  in the tests of Example 4 that were carried out in the presence of carbon dioxide in supercritical conditions.
Instead, the larger reactor has been used in the tests of Example 3 and in those of Example 4 that were carried out in subcritical conditions, in order to obtain an amount of recovered organic product large enough to investigate the recyclability by technological tests that are commonly used in the industrial practice, as described in Example 5.

In the tests, the samples have been taken from fiberglass-reinforced plastic waste coming from different industries, in the form of listels of predetermined standard size, which have been suitably mixed, in order to obtain samples that can represent the composition differences of the fiberglass-reinforced plastic waste that can occur in an industrial recovery process. In fact, in the productions of fiberglass-reinforced plastics, a) the resin/fiber ratio, i.e. the organic/inorganic ratio can vary in a range of values, depending on the operator that carries out the production cycle, as well as on the performances of a particular article and on the related design specifications; b) moreover, different types of polyester resins can be used, i.e. orthophthalic, isophthalic or vinylester resins. The samples to be tested were taken from the above-described mix of specimens.

EXAMPLES

A description of the tests of examples 1-5 will now be made, followed by the test data of each example and by the conclusion that can be drawn therefrom.

In the tests, fiberglass-reinforced plastic waste have been used made of unsaturated polyester resins of orthophthalic, isophthalic and vinylester type, obtained by a polycondensation reactions involving ethylene glycol, propylene glycol, and neopentyl glycol.

For all the tests, given in the examples 1-5, a mass balance has been calculated, in order to determine the amounts of organic material collected as recyclable liquid, the amount of organic material settled on the fibers as a carbonaceous residue and the amount of organic material lost due to material handling and/or to the formation of non-condensable compounds. All these data are given hereinafter. The examples serves to illustrate the invention only, and are not to be considered limitative.

Example 1

Comparison of the Efficiency of Pyrolysis Carried Out in the Presence of Different Gases, Such as: Nitrogen, Steam, Carbon Dioxide, and Check of the Organic/Inorganic Ratio of the Fiberglass-Reinforced Plastics Pyrolysis tests have been carried out in a carbon dioxide environment, according to the invention, and pyrolysis tests have also been carried out in nitrogen and steam environments, for the purpose of comparison, using the laboratory equipment diagrammatically shown in FIG. 2, and in the conditions summarized in table 1.

TABLE 1

Operating conditions of the comparative fiberglass-reinforced plastics pyrolysis tests in the presence of nitrogen, of steam and of carbon dioxide

| Pyrolysis in: | Nitrogen | Steam | $CO_2$ |
| --- | --- | --- | --- |
| Temperature, ° C. | 400 | 420 | 420 |
| Gas flowrate | 20 | 0.5 | 20 |
| Time (hrs) | 5 | 5 | 5 |
| Pressure (bar) | 1 | 1 | 1 |

The results of the pyrolysis tests, as well as of the combustion of the solid residue containing the glass fibers, are summarized in table 2. Analytical tests, such as iodine number determination and infrared analysis, have been performed on the liquid obtained.

TABLE 2

Yield of the organic products recovered by a fiberglass-reinforced plastics pyrolysis under flow of nitrogen, of steam and of carbon dioxide

| Gas | Initial mass fiberglass-reinforced plastics (g) | Liquid recovered by pyrolysis (g) | Fiberglass-reinforced plastics residue (g) | Organic losses after pyrolysis (g) | Solid residue (g) after calcination |
|---|---|---|---|---|---|
| $N_2$ | 23.72 | 7.22 | 13.33 | 3.17 | 8.65 |
| $H_2O$ | 25.0 | 8.85 | 12.25 | 3.9 | 9.14 |
| $CO_2$ | 10.08 | 5.1 | 3.9 | 1.08 | 3.68 |

Moreover, a fiberglass-reinforced plastic sample similar to the one used in the pyrolysis tests, of the weight of 8.30 g, has been calcinated as such at 650° C. overnight, and 3.05 g of solid residue were obtained consisting of the glass fibers and of the inorganic fraction of the gelcoat. The organic portion of the fiberglass-reinforced plastics is therefore 63.3% by weight, whereas the overall inorganic residue is 36.7%.

Pyrolysis in the Presence of Nitrogen

The recovered resin is 30.4% of the fiberglass-reinforced plastics initial weight. If only the organic compounds present in the fiberglass-reinforced plastics, in this tests 63.5% of the total weight, are taken as the reference for the yield, a value of 48% by weight can be calculated. From the mass balance, a loss of 3.17 g results that has not been collected along with the liquid obtained by condensation, which is 13.4% of the initial sample. A visual examination of the fiberglass-reinforced plastics after the treatment has shown a copious carbonaceous deposit on the surface of the fibers. By calcinating the fibers covered with this deposit in air to 650° C. for 5 hours, an amount of 8.65 g of clean glass fibers could be fully recovered, i.e. 36.5% of the initial fiberglass-reinforced plastics, which is an experimental value that fits the value obtained from the direct calcination test. A portion of the pyrolysis liquid has been obtained by repeatedly washing the reactor and the connection tubes with acetone. From the quantitative analysis of the unsaturations, an I.N.=42 g $I_2$/100 g of sample is obtained, which corresponds to 0.1653 moles of unsaturations per 100 g of sample.

Pyrolysis in the Presence of Steam

In the presence of steam, the pyrolysis takes place along with hydrolysis reactions and solvolysis effects. The cooling water flowrate has been reduced to avoid an excessive cooling during evaporation.

Water, which is present as steam, acts both as a carrier and as a reagent. The resin recovered both directly and by washing with acetone, is 35.4% of the initial weight the fiberglass-reinforced plastics. If only the organic compounds present in the fiberglass-reinforced plastics, in this tests 63.4% of the total weight, are taken as the reference for the yield, a value of 56% by weight can be calculated. From the mass balance, a loss of 3.9 g results that has not been collected along with the liquid obtained by condensation, which is 15.6% of the initial sample. The fiberglass-reinforced plastics, thermally treated by water, had a broken surface and shown a considerable carbonaceous deposit on the surface of the fibers, which completely disappeared, however, after 5 hours of calcination in air at 650° C. The weight of carbonaceous deposit is 3.1 g, and the inorganic solid residue after calcination, experimentally evaluated, is 36.6% of the total weight, which fits with the 36.7% value obtained by direct calcination of a sample of the initial fiberglass-reinforced plastics. The suspension of liquid residue and water at the outlet of the reactor has been subject to several separation and fresh water washing cycles. From the quantitative analysis of the unsaturations, an I.N.=48 g $I_2$/100 g of sample is obtained, which corresponds to 0.1914 moles of unsaturations per 100 g of sample. The separation of the resin from condensed water turned out to be a difficult operation, since the obtained material was sticky and a portion of it remained stuck on the walls of the collection vessel, while another part was dispersed in a colloidal form in the water.

Pyrolysis in the Presence of $CO_2$

The resin recovered both directly and by washing with acetone, is 50.6% of the initial weight the fiberglass-reinforced plastics. If only the organic compounds present in the fiberglass-reinforced plastics, in this tests 63.5% of the total weight, are taken as the reference for the yield, a value of 80% by weight can be calculated, which is clearly higher than the yield obtained in the pyrolysis tests in nitrogen environment, 48%, and in a steam environment, 56%, even in the non-optimized operating conditions that can be obtained in a laboratory test. From the mass balance is a loss of 1.08 g results, which is 10.7% of the initial sample, due to material handling and/or to the formation of volatile compounds. If the overall organic matter recovered by the pyrolysis from the fiberglass-reinforced plastics is taken into account, i.e., including also the fraction lost due to the manipulations and/or to non-condensable formation, the pyrolysis under $CO_2$ allows an organic matter conversion as high as 97% by weight.

Surprisingly, the thermal treatment under $CO_2$ yields a liquid residue that is more abundant and homogeneous than in the previous cases, and that is free from colloidal dispersions. The viscous residue is less thick and sticky. From the quantitative analysis of the unsaturations, an I.N.=77 g $I_2$/100 g of sample is obtained, which corresponds to 0.3035 moles of unsaturations per 100 g of sample, against 42 and 48 in the cases of pyrolysis in a nitrogen environment and in a steam environment, respectively.

The sample, after the treatment, has a very thin, graphite-like carbonaceous, deposit, and after calcination at 650° C. for 5 h, the carbonaceous and/or organic deposit on the surface of the glass fibers is completely burnt, and 3.68 g of glass fibers are obtained, containing also the inorganic portion of the gelcoat, which can be easily separated by shaking or blowing the glass fibers, which is obtained therefore unbroken and perfectly clean. In this case, experimental value of the solid residue after calcination is 36.5%, which fits the value of 36.7% obtained by direct calcination of the fiberglass-reinforced plastics.

Example 2

Figure 9:
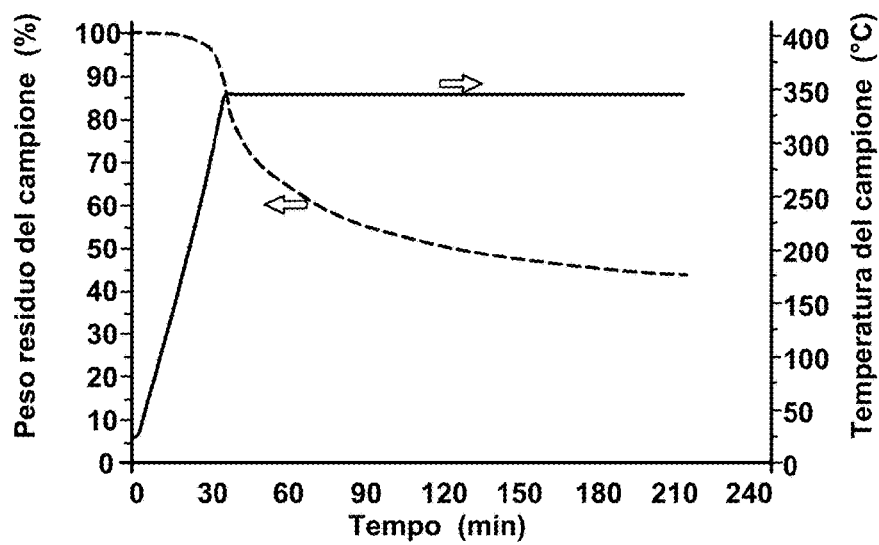
FIGS. 9-11 show thermogravimetric plots of waste samples at a constant temperature of 350° C., 375° C. and 425° C., respectively, during 3 hours under $CO_2$ flow, as in the pyrolysis conditions according to the invention.
Figure 10:
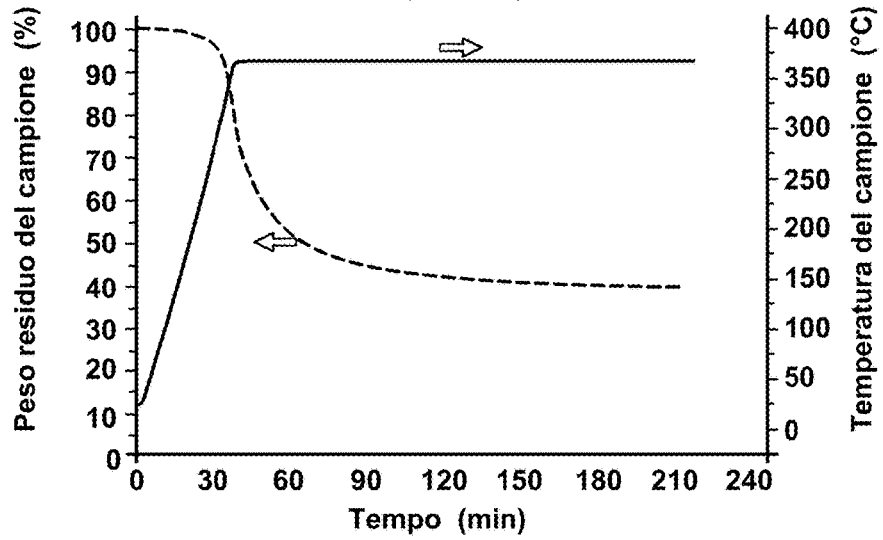
Figure 11:
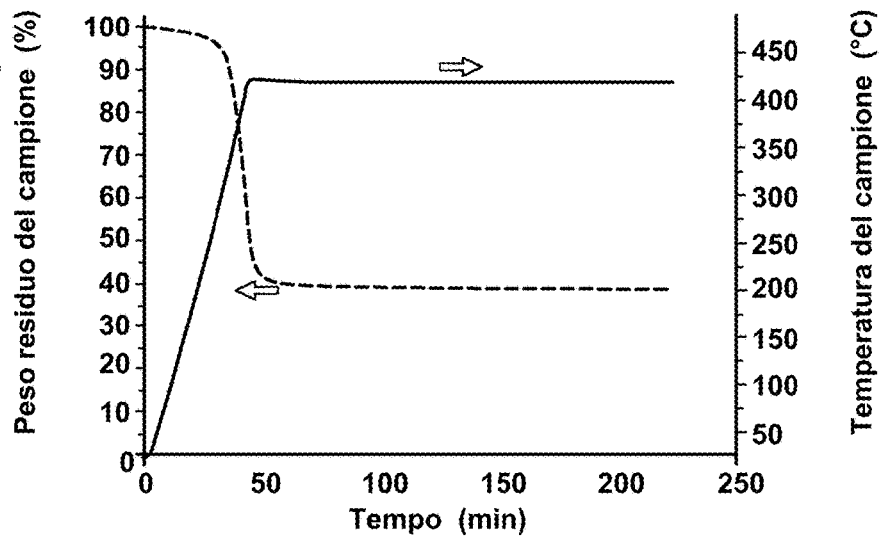
Figure 12:
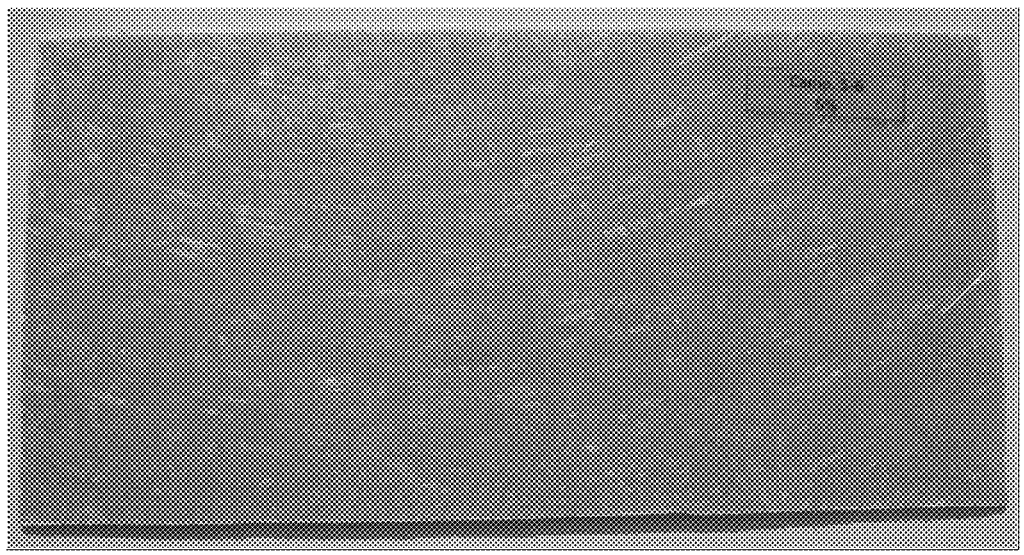
FIGS. 12-14 show fiberglass-reinforced plastic samples obtained by mixing a fresh prepolymer amount with 5%, 10% and 20%, respectively, of a recycled material produced in the tests of table 3.
Figure 13:
Figure 14:
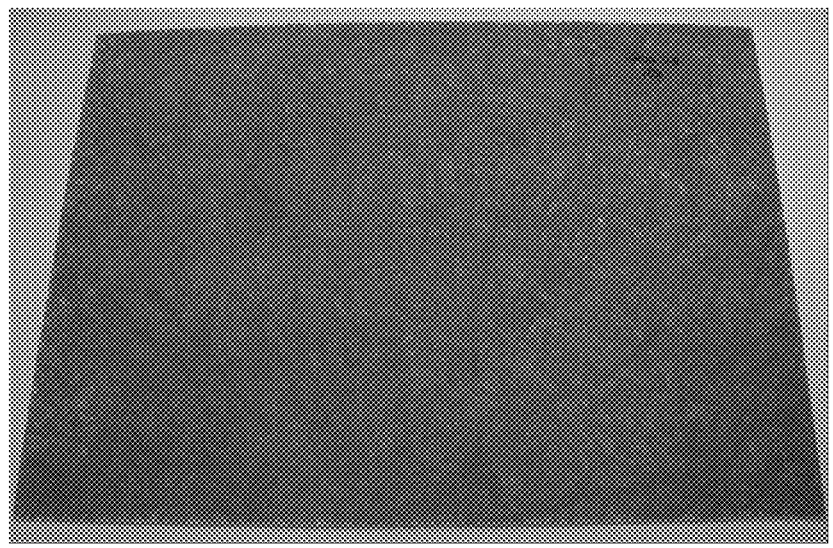
Figure 15:
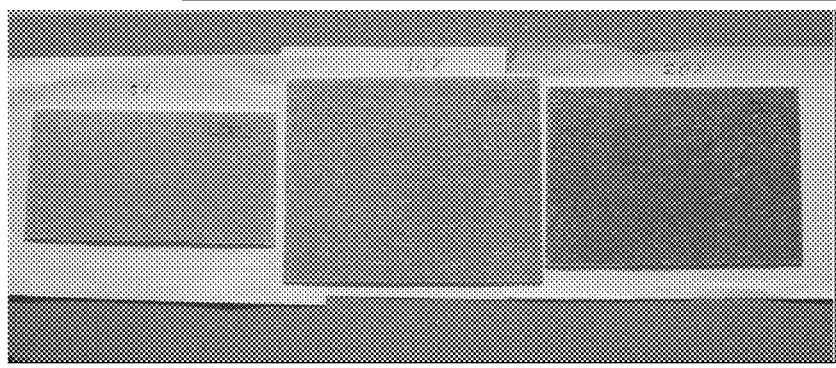
FIG. 15 shows a color comparison of the fiberglass-reinforced plastic samples of FIGS. 12-14.

Thermogravimetric Analysis of Fiberglass-Reinforced Plastic Samples Under a $CO_2$ Flow at Various Temperature, in Order to Identify the Optimal Process Conditions After realizing that the pyrolysis of the fiberglass-reinforced plastics in the presence of $CO_2$ makes it possible to recover substantially the whole organic portion as a polymerizable resin, thermal decomposition tests have been carried out on small fiberglass-reinforced plastic samples in a thermogravimetric balance, under a $CO_2$ flow and at three different pyrolysis temperatures, i.e. at 350° C., 375° C. and 425° C., in order to evaluate:

the reaction time required to complete the pyrolysis, and the optimum pyrolysis temperature, the yield that can be allowed.

in optimal process conditions, i.e. with a perfect control of the temperature in the reactor and under a high $CO_2$ flow on the sample. Pyrolysis temperatures were quickly achieved and then maintained. FIGS. 9, 10 and 11 show the results, respectively for three pyrolysis temperatures.

Figure 7:
FIG. 7 shows a step of introducing a fiberglass-reinforced plastic sample into a tubular pyrolysis reactor according to the invention, in a laboratory pyrolysis test.

As clearly shown by FIG. 11, the time for a complete pyrolysis is about one hour at 420° C. and about 2 hours at 375° C., while 4 to 5 hours are required at 350° C. At 425° C., the pyrolysis is particularly quick, since a weight loss is observed of about 62% in only 75 minutes, and some effects are already apparent at about 375° C. Therefore, it is preferable to maintain the pyrolysis temperature between 400° C. and 450° C. during 1.5-2 hours. These operating conditions have been used in the tests of the subsequent examples, which are carried out in a larger reactor (FIGS. 6 and 7).

Moreover, by comparing the temperature diagram of the pyrolysis at 425° C. with the temperature diagram of the calcination it can be argued that the pyrolysis, in optimal process conditions, can provide a yield as high as 95% by weight or higher. In fact:

in optimal reaction conditions, the pyrolysis can provide the recovery of about 62% by weight of the organic phase, as shown by the thermogravimetric tests under $CO_2$ flow;

in a combustion test in air of a fiberglass-reinforced plastic sample, also carried out always in a thermogravimetric balance, the loss of weight due to the destruction of the organic portion turned out to be 64%, according to the direct calcination test of Example 1, therefore, the optimal recovered organic fraction yield can be calculated as 62/64=97% by weight.

Example 3

Preliminary Tests in a Larger Reactor

Figure 8:
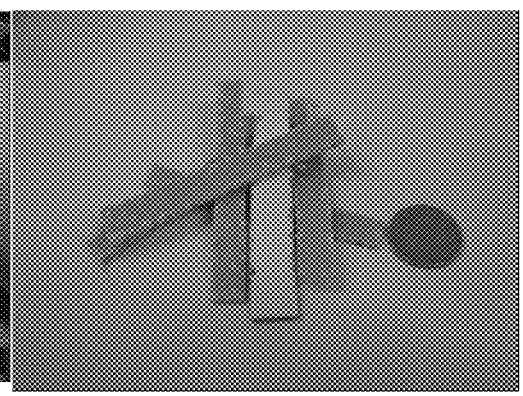
FIG. 8 shows of fiberglass-reinforced plastic pieces used in the laboratory tests of the examples, also containing a gelcoat layer.

A series of preliminary pyrolysis tests has been carried out on larger amounts of fiberglass-reinforced plastics to prepare amount of pyrolysis products large enough to evaluate their recyclability in technological tests to be performed on specimens made by a manufacturer of fiberglass-reinforced plastic articles, as described in Example 5. All the tests have been made in the same conditions in order to evaluate the reproducibility of the properties of the fiberglass-reinforced plastics, by using the larger tubular reactor 5 (FIG. 6), which has an inner diameter Φ of 40 mm (FIGS. 6 and 7), according to a scheme as shown in FIG. 2. For each test, about 350 grams of fiberglass-reinforced plastics, in the form of listels (FIGS. 7 and 8), have been loaded into the reactor, which is a first scale-up with respect to 10-25 g/test of the smaller reactor used in the tests of Example 1. The listels consists of a clearer gelcoat portion and of a darker laminate portion, which contains the resin and the glass fibers.

Waste 21 have been packed in the reactor 2 by arranging most of them in the zone heated by the oven.

The profile heat in the reactor (FIG. 5) has been determined by causing a thermocouple to slide within a through stainless steel ⅛" tube, arranged along the whole axis of the reactor, and by reading the temperature in several points.

The pressure in reactor 5 and in the first collection vessel 7' has been maintained at the predetermined value by means of pressure control valve 9 arranged on vent line 9' of vessel 7 (FIG. 2).

In all the tests, the $CO_2$ flowrate has been maintained at 20 $cm^3$/minute.

The first six tests have been made using a residence time of 2.5 hours in the reactor, of which 1.5 hours heating and 1 hour maintaining the pyrolysis temperature.

In these tests, the temperature profile shown in FIG. 5 has been used. It can be observed that a temperature of 410-420° C. was ensured in about 60% of length L of the reactor, whereas two opposite end portions, of 10 cm and 20 cm length, were at a lower temperature, between 330 and 410° C., and between 370 and 420° C., respectively at the inlet of the $CO_2$ and the outlet of the gas. As described, two Raschig rings beds were arranged in respective end portions of $L_r$=12 cm length. Therefore, only one portion of waste, about 60%, was subjected to a pyrolysis at about 420° C., while the remaining 40% was decomposed at lower temperatures.

The first six tests have confirmed the optimal reaction time evaluated by the thermogravimetric analysis of Example 2, and have confirmed the reproducibility of the results in terms of yield and of Iodine Number with respect to the values obtained in Example 1 using the smaller reactor.

In the test No. 7, the reaction time has been prolonged to 2 hours, at a temperature about 30° C. higher than the profile of FIG. 5, on average, i.e. reaching a value of about 450° C. in the central part of the reactor.

In all the tests, a relatively viscous light brown liquid fraction has been condensed from the gas mixture extracted from the reactor, which was collected in a collection flask provided with a reflux refrigerant, which has been then emptied and washed with acetone as a washing solvent. The tubular reactor has been also cleared of the treated fiberglass-reinforced plastics and internally washed several times with acetone, in order to recover the liquid left stuck on the walls of the reactor or on the Raschig rings. The liquid resulting from washing the reactor has then been joined to the liquid of the flask, and acetone has been evaporated in order to recover an organic liquid containing the pyrolysis products of the fiberglass-reinforced plastics, which has subsequently been put into a stove to remove any acetone traces. Then, the liquid has been weighed in order to determine the process yield in organic liquid, i.e. in pyrolysis products.

The iodine number I.N. of the pyrolysis liquid has then been measured, which was always set between 95 and 100. For comparison, a fresh prepolymer normally used for making fiberglass-reinforced plastic articles has an I.N. of 179.8, which drops to 67 if the styrene, which is present in the mixture as a solvent, is evaporated. Since the liquid containing the pyrolysis products according to the process contains lower styrene amounts, the iodine number of the recovered resin is fully comparable with the one of the fresh prepolymer. Some of the results obtained in the several tests performed are given in the table 3.

TABLE 3

Tests of pyrolysis of the fiberglass-reinforced plastics in the presence of $CO_2$ at 420° C. and at atmospheric pressure.

| Test No. | Initial mass of the sample of fiberglass-reinforced plastics (g) | Liquid recovered by pyrolysis (g) | Fiberglass-reinforced plastics residue (g) | Organic losses after pyrolysis (g) | Calculated % yield |
|---|---|---|---|---|---|
| 1 | 350.4 | 130.4 | 204.2 | 15.8 | 58.8 |
| 2 | 350.2 | 128.5 | 206.0 | 15.7 | 58.0 |
| 3 | 351.0 | 133.6 | 211.1 | 6.3 | 60.1 |
| 4 | 350.8 | 140.4 | 200.1 | 10.3 | 63.2 |
| 5 | 350.1 | 135.0 | 205.1 | 10.0 | 60.9 |
| 6 | 351.7 | 131.6 | 205.5 | 14.6 | 59.1 |
| 7 | 350.8 | 206.6 | 126.4 | 17.8 | 93.0 |

The losses after pyrolysis, definitely lower than the loss observed when using the smaller reactor in Example 1, can depend on both organic non-condensable compounds and on the resin lost due to various manipulations or stuck on the surfaces of the laboratory equipment. The yield estimate, instead, has been made under the assumption, as in Example 1, that a weight amount of 63.3% of the initial mass of the organic material is present in the treated fiberglass-reinforced plastics. In the tests 1-6, the yield was between 58% and 63%.

In the test 7 the yield rises to 93.0% by weight, which is a value close to the optimal yield value of 97% obtained by the thermogravimetric balance. This is probably due to increase of temperature from 420 to 450° C., as reference values for the center of the reactor, which compensates at least in part for the temperature gradient along the reactor, whose profile is shown in FIG. 5, and/or to the extension of the reaction time to 2 hours.

The solid residue left in the reactor at the end of the step of maintaining the temperature, i.e. at the end of the pyrolysis, can be weighed for checking the weight loss and for comparing it with the weight of the collected liquid sample. The discharged solid, comprising glass fibers and resin residues is black due to the deposits of carbonaceous and/or organic matter.

Figure 17:
FIGS. 17 and 18 show samples of glass fibers as obtained after the pyrolysis treatment only and after the further calcination treatment, respectively.
Figure 18:
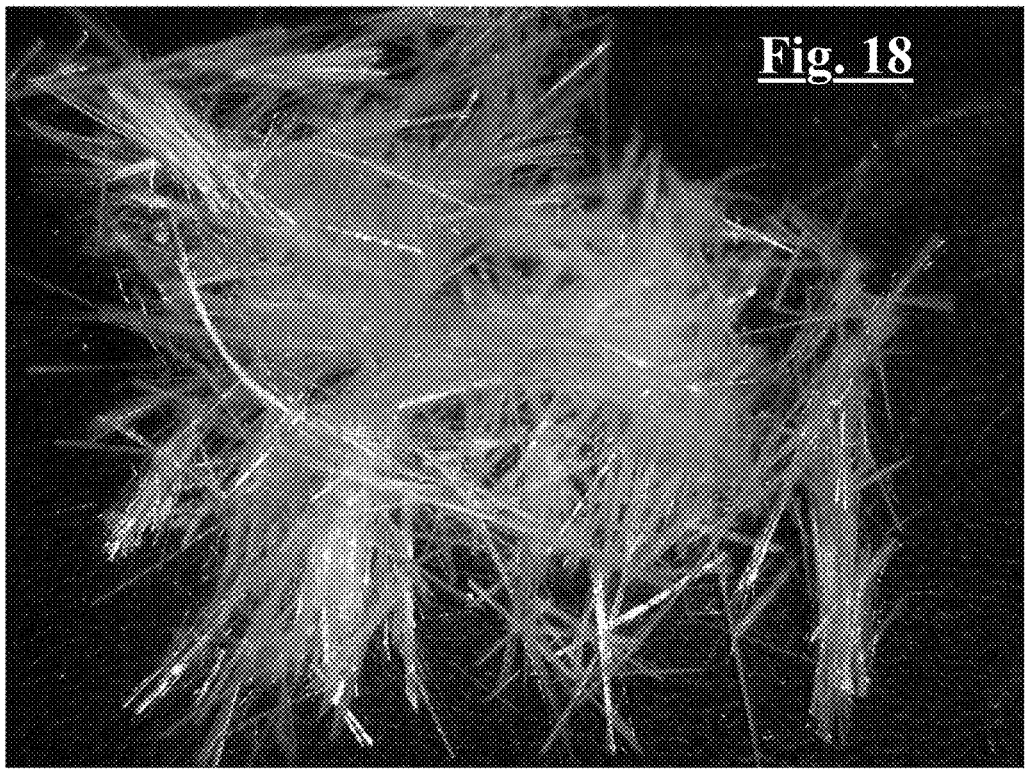

A portion of the solid residue after pyrolysis has been calcinated, i.e. burnt, in air at 650° C. within a muffle furnace for 12 hours. Temperatures set between 600° C. and 700° C. turned out to be useful as well. This way, the organic fraction residue left on the glass fibers after pyrolysis has been completely burned, and after the combustion the glass fibers was recovered along with the inorganic portion of the gelcoat, which could be easily separated from the glass fibers. FIGS. 17 and 18 show samples of glass fibers respectively at the end of the pyrolysis and after the calcination. In FIG. 17, a low organic material amount can be observed which forms a deposit on the glass fibers, and blackens them. FIG. 18 shows that the glass fibers are perfectly clean, after separating the organic waste from the inorganic fraction, in particular by calcination.

Example 4

Effect of the Pressure of $CO_2$ in the Pyrolysis of the Fiberglass-Reinforced Plastics on the Yield and on the Quality of the Recovered Resin Pyrolysis tests have been carried out in a $CO_2$-containing environment at pressures higher than the atmospheric pressure, in order to test the effect on the yield of the pyrolysis and on the processability of the pyrolysis organic products, as well as on the possibility to recycle them to a production process for making new fiberglass-reinforced plastic articles.

A first test (No. 8) has been made with the same apparatus of FIG. 2, using the larger tubular reactor (FIG. 6) by suitably adjusting the flow, according to the prefixed temperature and pressure, in order to allow the condensation, in one or more containers downstream of the pyrolysis reactor, substantially of the whole organic material removed by the $CO_2$, in particular at a flowrate of about 8 bar and 20 $cm^3$/minute, for a duration of 2.5 hours, of which 1.5 hours for reaching the pyrolysis temperature, 420° C., and 1 hour maintaining this temperature. The results of the test are given in table 4.

TABLE 4

Test (8) of pyrolysis of the fiberglass-reinforced plastics under a $CO_2$ flow at the pressure of about 8 bar

| Initial sample mass fiberglass-reinforced plastics (g) | Liquid recovered by pyrolysis (g) | Fiberglass-reinforced plastics residue (g) | Organic losses after pyrolysis (g) | Calculated % yield | Iodine number |
|---|---|---|---|---|---|
| 350.5 | 145.1 | 190.3 | 15.1 | 65.4 | 105 |

The yield has been estimated as in Example 3, i.e. by assuming an organic content of the initial sample of 63.3% by weight. The above comments about the yield and of the temperature profile of the test of table 3 applies also to this case. However, it is important to remark that that, under a same conditions of $CO_2$ flowrate, of pyrolysis temperature and of pyrolysis residence time (tests 1÷6, tab. 3), if the pressure of $CO_2$ is increased both the yield and the iodine number increase significantly.

A second test (n.9) has been performed at the same pyrolysis temperature, but at supercritical pressures and in static conditions, within the smaller tubular reactor, which was closed to one end. After introducing the fiberglass-reinforced plastic waste, the reactor has been filled with $CO_2$ to an initial pressure of 15 bar absolute, heated up to a temperature of 420° C. and then brought to a pressure of about 75 bar, still by introducing always with $CO_2$. In comparison with all the previous tests, the sample was not kept under a gas flow at atmospheric pressure or at about 8 bar, instead, it was brought under a static $CO_2$ pressure of about 75 bar and maintained in these conditions for 5 hours. At the end of the pyrolysis, the $CO_2$ has been allowed to flow to an atmospheric pressure environment by causing it to pass through the traps for collecting the pyrolysis liquid, subsequently the matter left in the reactor has been washed with acetone. The results obtained by this test are summarized in table 5.

TABLE 5

Test (9) of pyrolysis of the fiberglass-reinforced plastics in the presence of $CO_2$ under static conditions.

| Massa initial sample waste (g) | Liquid recovered by pyrolysis (g) | Fiberglass-reinforced plastics residue (g) | Organic losses after pyrolysis (g) | Solid res. After calcination (g) | Iodine number |
|---|---|---|---|---|---|
| 10.4 | 5.58 | 4.4 | 0.42 | 3.79 | 95 |

The amount of recovered resin, only liquid, is 53.7% of the initial weight the fiberglass-reinforced plastics. If only the organic compounds present in the fiberglass-reinforced plastics, in this tests 63.6% of the total weight, are taken as the reference for the yield, a value of 84.4% by weight can be calculated. From the mass balance, a loss of 0.42 g results that has not been collected along with the liquid obtained by condensation, which is 4.0% of the initial sample weight, whereas the carbonaceous and/or organic deposit on the glass fibers, in the form of a pitch material, is about the 5.9% by weight. The amount of solid residue after calcination, comprising the glass fibers and the inorganic portion of the gelcoat, fits with the values obtained in the other tests. The yield, considering the conditions of this test, i.e. the batch mode, is promising in view of the industrial application.

Moreover, the collected liquid resin was much less viscous than in the previous tests.

Example 5

Industrial Technological Recycle Tests to Assess Polymerizability of the Recovered Organic Liquid and the Mechanical Resistance of the Fiberglass-Reinforced Plastic Articles Made by Using Various Amounts of the Recycled Product The technological tests consisted in:
mixing a commercial fresh polyester resin with liquid pyrolysis products as such, i.e. as obtained from the tests of Example 3, at proportions of 5%, 10% and 20% by weight;
making specimens by crosslinking the mixture prepared as described above, within a mold;
evaluating by these specimens the features of the fiberglass-reinforced plastics produced this way, and precisely:
  the polymerization and the crosslinking of the organic matrix;
  the quality of the fiberglass-reinforced plastics produced, as it can be assessed by touch and by a visual examination;
  the tensile mechanical properties, i.e. the strength $R_t$, the elongation $\Delta L$ at break, the elasticity modulus $E_t$; and the bending mechanical properties, i.e. the strength $R_f$ and the elasticity modulus $E_f$.

The specimens have been manufactured by the contact shaping technology, also known as manual stratification or handlay-up technique, which provides three main steps as described hereinafter:
  waxing the mold and applying the gelcoat on the mold, which has the shape of a flat plate. A paraffin-based detaching agent was preliminarily applied on the mold, followed by the gelcoat, by the polyester resin dissolved in styrene, spraying them by an internal mixing pump, from a distance of about 50-60 cm, with different thin applications;
  lamination, i.e. alternated manual stratification of polyester resin dissolved in styrene, and of glass fibers sheets (E type glass, cut wired MAT (CSM)), after about 90 minutes or in any case when the gelcoat was hardened enough, up to a predetermined thickness (in this case, 3 layers of glass fibers sheets), using brushes and roller brushes for perfectly impregnate the fiber and finally a roller for eliminating possible air bubbles incorporated by the resin, in order to cause the resin to penetrate into empty spaces within of the glass fibers;
  curing within the mold for 24 hours, at room temperature, extracting from the mold by plastic wedges and post-polymerizing, firstly for 36 hours at room temperature, during which the reticulation is continued in mild conditions, and subsequently in a heated cabin provided with a forced ventilation system for 5 hours at about 50° C.

Virgin gelcoat and lamination resin have been used based on orthophthalic resins, even if other types of polyester resins can be used, for example isophthalic resins and vinylester resins.

For the purpose of comparison, a reference specimen has also been made exclusively from a virgin polyester resin obtained from the same production lot, without adding any pyrolysis products.

A same waxed and gel coated mold has been used to manufacture all the specimens, in order to prevent differences due to a different execution of the waxing and of the gel-coating steps. The gelcoat and the resin, containing cobalt octanoate as a chain initiator, have been applied after adding 2% Methyl-ethyl ketone peroxide as a catalyst.

Figure 16:
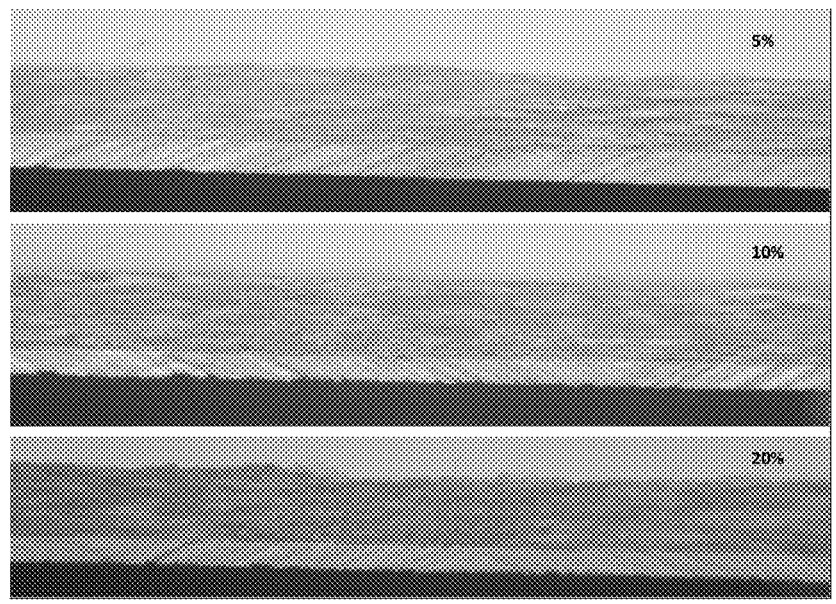
FIG. 16 shows side views of suitably cut fiberglass-reinforced plastic specimens of FIGS. 12-14.

The articles were well polymerized, the glass fibers were perfectly embedded in the resin and the gelcoat film was uniform (FIGS. 12-15). Neither delaminations nor defects at the gelcoat-laminate interface have been remarked in the specimen (FIG. 16). With reference to polymerization and to the crosslinking of the organic matrix, and to the properties that can be perceived by touch and by a visual examination, it is possible to conclude that the use of the organic material recovered by the pyrolysis process according to the invention has no drawbacks at any of the indicated mixture proportions, with respect to the articles obtained from commercial resins.

TABLE 6

Comparison of the mechanical properties of fiberglass-reinforced plastics produced from recycled material and from virgin resin only. Tests performed at Department of Chemical Engineering Materials and Industrial Production of University of Naples "Federico II".

| | weight % of pyrolysis liquid in the resin (prepolymer) | | | |
|---|---|---|---|---|
| Test | 0 | 5 | 10 | 20 |
| Tensile test (ASTM D790) | | | | |
| F (kN) | 2.4 ± 0.2 | 1.9 ± 0.2 | 2.0 ± 0.3 | 2.5 ± 0.4 |
| $R_t$ (MPa) | 94.4 ± 7.0 | 90.1 ± 4.8 | 88.4 ± 16.7 | 106.7 ± 14.8 |
| $\Delta L$ (%) | 5.0 ± 1.9 | 4.3 ± 0.8 | 5.2 ± 1.3 | 5.3 ± 1.1 |
| $E_t$ (MPa) | 3866 ± 229 | 3633 ± 375 | 3704 ± 304 | 4320 ± 323 |
| Bending test (ASTM D790) | | | | |
| $R_f$ (MPa) | 120.6 ± 14.5 | 88.7 ± 22.4 | 117.5 ± 3.4 | 126.6 ± 4.8 |
| $E_f$ (MPa) | 3619 ± 220 | 3100 ± 291 | 3382 ± 289 | 3611 ± 211 |

The specimens made according to the invention have been subject to mechanical strength tests and the results have been compared with the mechanical strength of the reference specimen. The results are summarized in table 6.

From these results it can be deduced that the presence of a recycled material, obtained as described in the present invention, does not modify the mechanical properties of the fiberglass-reinforced plastic articles with respect to the articles obtained from commercially available resins conventionally used to make fiberglass-reinforced plastic articles. The result is undoubtedly very importance if one considers that one of the peculiar features of the fiberglass-reinforced plastics with respect to the traditional engineering materials, which allowed a widespread diffusion over the time, is their remarkable mechanical performances. A deterioration of such performances due to the recycled material would have certainly prevented a useful reuse to make new fiberglass-reinforced plastic objects.

In fact, even if the resistance and the stiffness of a composite material mainly depend on the reinforcing material, in this case on the glass fibers, and, in particular, on the direction the fibers, the mechanical behavior is any case remarkably affected by the cooperation between the reinforcing material and the matrix, i.e. by the interface adhesion between the matrix and the fibers. Considering the tensile and bending strength values, it is understood that this cooperation is not at all deteriorated by the recycled product present in the polymer matrix. Therefore, the final product according to the present invention is actually and fully recyclable and allows industrial applications in the manufacture of industrial articles whose performances are fully equivalent to the ones provided by the conventional fiberglass-reinforced plastic articles, in normal use conditions.

The tests allows to conclude that the pyrolysis in the presence of carbon dioxide is surprisingly more advantageous than any pyrolysis carried out in a nitrogen or stem environment, since the former provides an organic liquid:
at a yield higher than in the prior art pyrolysis processes; that is cheaper and easier to separate;
having an iodine number that is higher than in the prior art pyrolysis processes, and that is comparable to the one of the commercial unsaturated resins, due to the presence of molecules rich in double bonds, that can be involved in crosslinking reactions, which makes the recovered product perfectly recyclable as such as for manufacturing new fiberglass-reinforced plastics.

The foregoing description exemplary embodiments of the invention will so fully reveal the invention according to the conceptual point of view, so that others, by applying current knowledge, will be able to modify and/or adapt in various applications the specific exemplary embodiments without further research and without parting from the invention, and, accordingly, it is meant that such adaptations and modifications will have to be considered as equivalent to the specific embodiments. The means and the materials to realise the different functions described herein could have a different nature without, for this reason, departing from the field of the invention. It is to be understood that the phraseology or terminology that is employed herein is for the purpose of description and not of limitation.

BIBLIOGRAPHY

[1] Kanji Suyama, Masafumi Kubota, Masamitsu Shirai, Hiroyuki Yoshida, Degradation of crosslinked unsaturated polyesters in sub-critical water, Polymer Degradation and Stability 92 (2007) 317,322.
[2] T. Sugeta, S. Nagaoka, K. Otake, T. Sako, 2001, Decomposition of fiber reinforced plastics using fluid at high temperature and pressure, Kobunshi Ronbunshu 58 (2001) 557-563.
[3] J. Economy, A. G. Andreopoulos, 1996, A new concept for recycling of thermosetting resins I: the case of crosslinking copolymers, Polym Adv Technol 1996; 7:561-570.
[4] K. H. Yoon, A. T. Di Benedetto, S. J. Huang, Recycling of unsaturated polyester resin using propylene glycol, Polymer 1997; 38(9):2281e5.
[5] Tomoko lwaya-Shinpei Tokuno—Mitsuru Sasaki—Motonobu Goto—Katsuji Shibata, Recycling of fiber reinforced plastics using depolymerization by solvothermal reaction with catalyst, J Mater Sci (2008) 43:2452-2456
[6] I. Okajima, K. Yamada, T. Sugeta, T. Sako, 2002, Decomposition of epoxy resin and recycling of Vetroresina with sub- and supercritical water, Kagaku Kogaku Ronbunshu 28 (2002) 553-558.
[7] A. Kamimura, K. Yamada, T. Kuratani, Y. Taguchi, F. Tomonaga, Effective depolymerization waste VETRORESINAs by treatment with DMAP and supercritical alcohol, Chem. Lett. 35 (2006) 586-587.
[8] A. Kamimura, K. Yamada, T. Kuratani, Y. Taguchi, F. Tomonaga, Efficient chemical re cycling of waste fiber-reinforced polymers: use of reduce amounts of DMAP and activated charcoal for the purification of recovered monomer, J Mater Cycles Waste Manag (2010) 12:93-97.
[9] A. Kamimura, K. Yamada, T. Kuratani Y. Oishi, T. Watanabe, T. Yoshida, F. Tomonaga, DMAP as an effective catalyst to accelerate sufficient solubilization of waste VETRORESINA: a new method for recycling waste plastics, Chem Sus Chem 1:845-850 (2008)
[10] H. Fukuzawa, K. Shibata, H. Izawa, Proc. 13th Conference of the Japan Society Of Waste Management Experts, 2002, p. 1:428.
[11] T. Nakagawa, 2008. Vetroresina recycling technology using sub-critical water hydrolysis, JEC Composites Mag. (March-April) (2008) 40-43.
[12] Cunliffe et al, Characterisation of products from the recycling of glass fiber reinforced polyester waste by pyrolysis, Fuel. IPC science and technology press. Guildford, G B, vol. 82. no. 18, 1° December 2003, pp. 2223-2230.
[13] Hong et al, Thermogravimetric analysis 1-12 and kinetic study of waste printed circuit board in various atmospheres, 3rd International conference on energy, environment and sustainable development, Shangai, 12-13 Nov. 2013, in Advanced Materials Research Vol. 864-867 (2014), Trans Tech Publications, Switzerland.
[14] Zhixiao Zhang et al., Experimental research on microwave induced thermal decomposition of printed circuit board wastes, Proceedings of the 18th Annual North American Waste-to-Energy Conference NAWTEC18, 11-13 May 2010.
[15] Xiaojuan Guo et al., Study on low-temperature pyrolysis of large-size printed circuit boards, Journal of Analytical and Applied Pyrolysis, vol. 105, 18 November 2013, pp. 151-156.

The invention claimed is:

1. A process for treating a fiberglass-reinforced plastic waste comprising:
a matrix of an unsaturated polyester resin;
reinforcement glass fibers incorporated in said matrix, said process comprising the steps of:
prearranging a reactor comprising a pyrolysis chamber;
feeding said fiberglass-reinforced plastic waste into said pyrolysis chamber;
removing oxygen from said pyrolysis chamber down to a predetermined residual oxygen concentration;
creating a $CO_2$-containing environment in said pyrolysis chamber, at a 30% minimum $CO_2$ volume concentration;
heating said fiberglass-reinforced plastic waste in said pyrolysis chamber and reaching a pyrolysis temperature set between 350° C. and 550° C.;
wherein said step of removing oxygen and said step of reaching a pyrolysis temperature are carried out in such a way that said residual oxygen concentration is attained before reaching said pyrolysis temperature;

maintaining said $CO_2$-containing environment and said pyrolysis temperature in said pyrolysis chamber for a predetermined residence time, obtaining a gas mixture containing products of pyrolysis of said unsaturated polyester resin, and a solid residue comprising said glass fibers;

extracting said gas mixture from said pyrolysis chamber;

condensing said pyrolysis products from said gas mixture in a condensation chamber, obtaining a condensate liquid phase comprising a product of pyrolysis that is separated from the uncondensed gas, such that said organic liquid can be recycled to a production process of fiberglass-reinforced plastics as a mixture with commercial unsaturated resins; and extracting said solid residue from said pyrolysis chamber.

2. The process according to claim 1, wherein said $CO_2$ volume concentration is higher than 50%.

3. The process according to claim 1, wherein said step of creating a $CO_2$-containing environment, and said step of removing oxygen, are carried out at the same time by a step of maintaining a substantially pure $CO_2$ flow through said pyrolysis chamber.

4. The process according to claim 1, wherein said step of creating a $CO_2$-containing environment, and said step of removing oxygen, comprise alternating in said pyrolysis chamber:
one or more steps of supplying an amount of an inert gas, or of substantially pure $CO_2$, with
one or more steps of creating a vacuum degree,
and a final step of supplying a final amount of substantially pure $CO_2$ at a predetermined pressure after alternating said steps of supplying and of creating a vacuum degree.

5. The process according to claim 1, wherein said residual oxygen concentration is lower than 10%.

6. The process according to claim 1, wherein said pyrolysis temperature is set between 400 and 500° C.

7. The process according to claim 1, wherein said pyrolysis temperature is set between 400° C. and 450° C.

8. The process according to claim 7, wherein said residence time is set between 1 and 2 hours.

9. The process according to claim 1, wherein said step of maintaining said $CO_2$-containing environment and said pyrolysis temperature in said pyrolysis chamber is carried out at a pressure set between 0.2 and 20 bar absolute.

10. The process according to claim 1, wherein said step of maintaining said $CO_2$-containing environment and said pyrolysis temperature in said pyrolysis chamber is carried out at a pressure higher than 6 bar absolute.

11. The process according to claim 1, wherein said step of maintaining said $CO_2$-containing environment and said pyrolysis temperature in said pyrolysis chamber is carried out at a pressure higher than 73 bar absolute.

12. The process according to claim 1, wherein said unsaturated polyester resin is selected from the group consisting of:
an isophthalic polyester resin;
an orthophthalic polyester resin;
a vinylester resin; and
a combination thereof.

13. The process according to claim 1, comprising:
a step of collecting a non-condensable gas left by said step of condensing said gas mixture containing pyrolysis products, said non-condensable gas including $CO_2$, and
a step of recycling said non-condensable gas into said pyrolysis chamber carried out during said step of creating a $CO_2$-containing environment and/or during said step of maintaining the $CO_2$-containing environment and the pyrolysis temperature.

14. The process according to claim 13, comprising a step of removing a vapor residue of said pyrolysis products from said non-condensable gas, wherein said step of removing is carried out before said step of recycling said non-condensable gas.

15. The process according to claim 14, wherein said step of removing a vapor residue of said pyrolysis products comprises a combustion step to which said non-condensable gas is fed.

16. The process according to claim 13, comprising a step of removing moisture from said non-condensable gas, wherein said step of removing moisture is carried out before said step of recycling said non-condensable gas.

17. The process according to claim 16, wherein said step of removing moisture comprises a condensation step to which said non-condensable gas is fed.

18. The process according to claim 1, comprising a step of washing said pyrolysis chamber and/or said condensation chamber with a solvent, carried out after said step of extracting said gas mixture from said pyrolysis chamber, so as to form a solution of further pyrolysis products in said solvent, and a step of removing said solution from said pyrolysis chamber.

19. The process according to claim 18, wherein said solvent is selected from the group consisting of÷ acetone; methyl-ethyl-ketone; tetrahydrofuran; and mixtures thereof.

20. The process according to claim 18, comprising:
a step of separating said solvent from said further pyrolysis products, and
a step of mixing said further pyrolysis products, recovered in said step of separating said solvent, with said pyrolysis products recovered in said step of condensing from said gas mixture.

21. The process according to claim 18, wherein said solvent is selected between methyl methacrylate and styrene.

22. The process according to claim 21, comprising a step of mixing said solution of said further pyrolysis products, which contains methyl-methacrylate and/or styrene, with said pyrolysis products recovered in said step of condensing from said gas mixture.

23. The process according to claim 22, wherein said step of mixing is carried out so as to obtain a mixture having a predetermined iodine number and/or viscosity.

24. The process according to claim 1, further comprising forming an article by combining the pyrolysis products, obtained after the extracting step, with an unsaturated thermosetting polyester resin.

25. The process according to claim 1, wherein said solid residue also comprises an amount of a solid organic deposit, and said process comprises a step of separating said solid organic deposit from said glass fibers.

26. The process according to claim 25, wherein said step of separating said solid organic deposit from said glass fibers comprises a step of heating and treating said solid residue in air at a treatment temperature set between 500° C. and 750° C. for a predetermined time, so as to cause a combustion of said solid organic deposit and to set said glass fibers free from said solid organic deposit.

27. The process according to claim 26, wherein said treatment temperature is set between 600° C. and 700° C.

28. The process according to claim 26, comprising:
a step of collecting a combustion gas produced in said step of heating and treating said solid residue, and a step of recycling said combustion gas into said pyrolysis chamber carried out during said step of creating a $CO_2$-containing environment and/or during said step of maintaining.

29. The process according to claim 28, comprising a step of removing moisture from said combustion gas, wherein said step of removing moisture is carried out before said step of recycling said combustion gas.

30. The process according to claim 29, wherein said step of removing moisture comprises a condensation step to which said combustion gas is fed.

31. The process according to claim 1, further comprising forming an article by combining the glass fibers of the solid residue with a polymeric material.

32. The process according to claim 1, wherein said step of prearranging a pyrolysis reactor comprises a step of arranging a bed of an inert filling material into said pyrolysis chamber, at an inlet zone of said $CO_2$ proximate to an inlet port of said $CO_2$, through which said $CO_2$ is supplied into said pyrolysis chamber, said filling material arranged to allow said $CO_2$ to flow from said inlet port to a zone in said pyrolysis chamber free from said filling material, and arranged to transmit an amount of heat to said $CO_2$ so as to preheat said $CO_2$.

33. The process according to claim 1, wherein
said step of maintaining said $CO_2$-containing environment and said pyrolysis temperature comprises a step of continuously feeding substantially pure $CO_2$ into said pyrolysis chamber, and
said step of extracting said gas mixture from said pyrolysis chamber is carried out continuously during said step of maintaining, in order to keep a predetermined pressure within said pyrolysis chamber.

34. The process according to claim 1, wherein said step of feeding said fiberglass-reinforced plastic waste into said pyrolysis chamber is carried out continuously during said step of maintaining.

35. The process according to claim 34, wherein said step of extracting said solid residue from said pyrolysis chamber is carried out continuously during said step of maintaining.

36. The process according to claim 34, wherein said step of continuously feeding $CO_2$, said step of extracting, and said step of feeding said fiberglass-reinforced plastic waste are carried out in such a way that a countercurrent flow is maintained within said pyrolysis chamber of:
a stream that, when entering into the pyrolysis chamber, is substantially formed by said $CO_2$ as supplied and that, by flowing within the pyrolysis chamber, becomes richer in pyrolysis products forming said gas mixture containing pyrolysis products, on the one hand, and
a solid stream turning from said fiberglass-reinforced plastic waste into said solid residue, on the other hand.

37. A process for treating an unsaturated polyester resin waste comprising the steps of:
prearranging a reactor comprising a pyrolysis chamber;
feeding said unsaturated polyester resin waste into said pyrolysis chamber;
removing oxygen from said pyrolysis chamber down to a predetermined residual oxygen concentration;
creating a $CO_2$-containing environment in said pyrolysis chamber, at a 30% minimum $CO_2$ volume concentration;
heating said unsaturated polyester resin waste in said pyrolysis chamber and reaching a pyrolysis temperature set between 350° C. and 550° C.,
wherein said step of removing oxygen and said step of reaching a pyrolysis temperature are carried out in such a way that said residual oxygen concentration is attained before reaching said pyrolysis temperature (Tp);
maintaining said $CO_2$-containing environment and said pyrolysis temperature in said pyrolysis chamber for a predetermined residence time, obtaining a gas mixture containing products of pyrolysis of said unsaturated polyester resin; and
extracting said gas mixture from said pyrolysis chamber;
condensing said pyrolysis products from said gas mixture in a condensation chamber, obtaining a condensate liquid phase, comprising a product of pyrolysis that is separated from the uncondensed gas, such that said organic liquid can be recycled as such to a production process of fiberglass-reinforced plastics as a mixture with commercial unsaturated resins.

38. The process according to claim 24, wherein the pyrolysis products obtained after the extracting step are present in the condensate liquid phase obtained from the condensing.

* * * * *